United States Patent
Lummerstorfer et al.

(10) Patent No.: US 12,404,394 B2
(45) Date of Patent: Sep. 2, 2025

(54) HIGH FLOW POLYPROPYLENE COMPOSITION FOR INJECTION MOULDING APPLICATIONS

(71) Applicant: BOREALIS AG, Vienna (AT)

(72) Inventors: Thomas Lummerstorfer, Linz (AT); Claudia Kniesel, Linz (AT); Daniela Mileva, Linz (AT); Thomas Horill, Schwechat-Mannswörth (AT); Mahdi Abbasi, Linz (AT); Cornelia Anita Tranninger, Linz (AT); Markus Gahleitner, Linz (AT); Francis Reny Costa, Linz (AT)

(73) Assignee: BOREALIS AG, Vienna (AT)

( * ) Notice: Subject to any disclaimer, the term of this patent is extended or adjusted under 35 U.S.C. 154(b) by 0 days.

(21) Appl. No.: 18/847,967

(22) PCT Filed: Mar. 21, 2023

(86) PCT No.: PCT/EP2023/057126
§ 371 (c)(1),
(2) Date: Sep. 17, 2024

(87) PCT Pub. No.: WO2023/180272
PCT Pub. Date: Sep. 28, 2023

(65) Prior Publication Data
US 2025/0109287 A1    Apr. 3, 2025

(30) Foreign Application Priority Data
Mar. 23, 2022   (EP) .................................... 22163738

(51) Int. Cl.
| | |
|---|---|
| C08L 23/16 | (2006.01) |
| C08F 2/00 | (2006.01) |
| C08F 210/06 | (2006.01) |
| C08F 210/16 | (2006.01) |
| C08K 3/34 | (2006.01) |
| C08L 23/12 | (2006.01) |

(52) U.S. Cl.
CPC .............. C08L 23/12 (2013.01); C08F 2/001 (2013.01); C08F 210/06 (2013.01); C08F 210/16 (2013.01); C08K 3/346 (2013.01); C08L 23/16 (2013.01); C08K 2201/005 (2013.01); C08L 2205/025 (2013.01); C08L 2205/035 (2013.01); C08L 2207/02 (2013.01); C08L 2314/02 (2013.01)

(58) Field of Classification Search
CPC .......... C08L 23/12; C08L 23/14; C08L 23/16; C08L 2207/02; C08L 2205/24; C08F 210/16; C08F 2/001
See application file for complete search history.

(56) References Cited

U.S. PATENT DOCUMENTS

| | | | | |
|---|---|---|---|---|
| 10,759,931 | B2 * | 9/2020 | Kniesel | C08L 23/16 |
| 11,084,920 | B2 * | 8/2021 | Gahleitner | C08L 23/14 |
| 11,292,900 | B2 * | 4/2022 | Gahleitner | C08L 23/12 |
| 11,578,196 | B2 * | 2/2023 | Wang | C08K 3/013 |
| 11,952,482 | B2 * | 4/2024 | Tranninger | C08L 23/0815 |
| 2022/0195166 | A1 * | 6/2022 | Wang | C08L 23/12 |
| 2022/0389204 | A1 * | 12/2022 | Wang | C08F 210/06 |
| 2022/0396695 | A1 * | 12/2022 | Wang | C08F 10/06 |
| 2023/0096321 | A1 * | 3/2023 | Wang | C08L 23/0815 |
| | | | | 525/240 |
| 2023/0303812 | A1 * | 9/2023 | Wang | C08L 23/16 |
| 2023/0348705 | A1 * | 11/2023 | Wang | C08L 23/12 |
| 2024/0084080 | A1 * | 3/2024 | Wang | C08L 23/16 |
| 2024/0262999 | A1 * | 8/2024 | Legras | C08K 3/346 |
| 2024/0400811 | A1 * | 12/2024 | Mileva | C08L 23/12 |

FOREIGN PATENT DOCUMENTS

| | | | |
|---|---|---|---|
| EP | 0887379 B1 | 12/2004 | |
| EP | 2610270 A1 | 7/2013 | |
| EP | 2610272 A1 | 7/2013 | |
| EP | 3015504 A1 | 5/2016 | |
| EP | 2960256 B1 | 4/2018 | |
| EP | 2960279 B1 | 4/2018 | |
| EP | 2610271 B1 | 3/2019 | |
| EP | 3940003 A1 | 1/2022 | |
| EP | 3945097 A1 * | 2/2022 | ............ C08F 210/06 |
| EP | 3945098 A1 * | 2/2022 | ............ C08F 210/06 |
| WO | 9212182 A1 | 7/1992 | |
| WO | 9924478 A1 | 5/1999 | |
| WO | 9924479 A1 | 5/1999 | |
| WO | 0068315 A1 | 11/2000 | |
| WO | 2004000899 A1 | 12/2003 | |

(Continued)

OTHER PUBLICATIONS

International Search Report and Written Opinion for PCT/EP2023/057126 mailed Jun. 2, 2023, 12 pages.
European Search Report for Application No. 22163738.2 dated Sep. 9, 2022, 8 pages.
Busico, et al., "Alk-1-ene Polymerization in the Presence of a Monocyclopentadienyl Zirconium (iv) Acetamidinate Catalyst: Microstructural and Mechanistic Insights a," Macromolecular Rapid Commun., vol. 28, 2007, pp. 1128-1134.
Ljiljana Jeremic, Andreas Albrecht, Martina Sandholzer Markus Gahleitner (2020) Rapid characterization of high-impact ethylene-propylene copolymer composition by crystallization extraction separation: comparability to standard separation methods, International Journal of Polymer Analysis and Characterization, 25:8, 581-596.
Zhou, Z., et al. J. Mag. Reson. 187 (2007) 225, and in Busico, V., et al., Macromol. Rapid Commun. 2007, 28, 1128.

(Continued)

Primary Examiner — Rip A Lee
(74) Attorney, Agent, or Firm — Lowenstein Sandler LLP

(57) ABSTRACT

The present invention relates to polypropylene compositions having a meltflow rate $MFR_2$ of 75 to 250 g/10 min suitable especially for injection moulding applications comprising a heterophasic propylene copolymer and a particulate inorganic nucleating agent, a process for producing said polypropylene composition, an article comprising said polypropylene composition and the use of said polypropylene composition for injection molding of articles.

14 Claims, 2 Drawing Sheets

(56) References Cited

FOREIGN PATENT DOCUMENTS

| WO | 2004111095 A1 | 12/2004 | | |
|----|---------------|---------|---|---|
| WO | 2012007430 A1 | 1/2012 | | |
| WO | 2016066446 A1 | 5/2016 | | |
| WO | 2017148970 A1 | 9/2017 | | |
| WO | WO-2021144401 A1 * | 7/2021 | ............... | C08K 3/08 |
| WO | WO-2021185924 A1 * | 9/2021 | ............. | C08K 5/524 |

OTHER PUBLICATIONS

Cheng, H.N., "C Nmr Analysis of Ethylene-Propylene Rubbers," Macromolecules, 1984, vol. 17, 1984, pp. 1950-1955.

Wang, et al., "Structural Analysis of Ethylene/Propylene Copolymers Synthesized with a Constrained Geometry Catalyst," Macromolecules, 2000, vol. 33, pp. 1157-1162.

Grein et al., "Melt Viscosity Effects in Ethylene—Propylene Copolymers" Rheologica Acta 46 (2007) 1083-1089.

Singh, et al., "Triad Sequence Determination of Ethylene-Propylene Copolymers—Application of Quantitative 13C Nmr," Polymer Testing, 2009, vol. 29, pp. 475-479.

* cited by examiner

HIGH FLOW POLYPROPYLENE COMPOSITION FOR INJECTION MOULDING APPLICATIONS

CROSS-REFERENCE TO RELATED APPLICATION(S)

The present application is a national stage entry under 35 U.S.C. § 371 of International Application No. PCT/EP2023/057126, filed on Mar. 21, 2023, which claims priority to European (EP) patent application No. 22163738.2, filed on Mar. 23, 2022. The contents of these applications are hereby incorporated by reference in their entirety.

FIELD OF THE INVENTION

The present invention relates to polypropylene compositions having a melt flow rate $MFR_2$ of 75 to 250 g/10 min suitable especially for injection moulding applications comprising a heterophasic propylene copolymer and a particulate inorganic nucleating agent.

TECHNICAL BACKGROUND

Heterophasic propylene copolymers are widely used in the automotive industry, due to their excellent combination of stiffness and impact behaviour.

There are two trends in the automotive industry:

Weight reduction demanding thin-wall constructions and the need to keep mineral reinforcements at a low level.

Use of post-industrial and even post-consumer recyclate material of lower MFR and limited impact strength, requiring a boost by other components in the final composition.

For meeting these requirements the compositions suitable for automotive applications need to have a high flowability, indicated in a high melt flow rate, and high toughness after processing, indicated in a low initial coefficient of linear thermal expansion (CLTE), good impact properties, especially at low temperatures, indicated in high Charpy notched impact strength and instrumented puncture test and a high stiffness, indicated in high tensile modulus, are necessary.

The properties of the compositions can be adjusted by introducing polymeric components which adapt the properties of the elastomeric phase of the one or more heterophasic polypropylene copolymer(s) such as elastomeric polymers like plastomers and/or by introducing polymeric components which adapt the properties of the matrix phase of the one or more heterophasic polypropylene copolymer(s) such as propylene homo- or random copolymers.

However, a more distinct effect can be obtained by adapting the properties of the one or more heterophasic propylene copolymer(s) as main component of the composition.

WO 2017/148970 A1 discloses heterophasic propylene copolymers, which comprise a multimodal matrix phase and can have a high melt flow rate. However, the examples showing a high melt flow rate of at least 70 g/10 min show a rather poor balance of tensile and impact properties especially at low temperatures.

Therefore, there is a need in the art for new heterophasic propylene copolymers, which are suitable as major component in polypropylene compositions suitable for injection moulding applications. It has been found that by carefully adapting the properties of the heterophasic propylene copolymer, especially the properties of the elastomer phase, compositions can be obtained which show a superior balance of properties in regard of high flowability, indicated in a high melt flow rate, and high dimensional stability after processing, indicated in a low initial coefficient of linear thermal expansion (CLTE), good impact properties, especially at low temperatures, indicated in high Charpy notched impact strength and instrumented puncture test and a high stiffness, indicated in high tensile modulus. These polypropylene compositions qualify for injection moulded applications, especially for automotive applications.

SUMMARY OF THE INVENTION

The present invention relates to a polypropylene composition comprising
- (A) at least 95.0 wt.-%, such as from 95.0 to 99.9 wt.-%, preferably from 96.0 to 99.5 wt.-%, more preferably from 97.5 to 99.0 wt.-% of a heterophasic propylene copolymer; and
- (B) up to 1.5 wt.-%, such as from 0.01 to 1.5 wt.-%, preferably from 0.1 to 1.3 wt.-%, more preferably from 0.2 to 1.2 wt.-% of a particulate inorganic nucleating agent, whereby all percentages refer to the total composition, and whereby the heterophasic propylene copolymer (A) comprises a matrix phase and an elastomeric phase dispersed therein and the composition has a soluble fraction (SF) and a crystalline fraction (CF), determined according to CRYSTEX QC analysis;

a soluble fraction (SF) content determined according to CRYSTEX QC analysis in the range from 15.0 wt.-% to 30.0 wt.-%, preferably from 17.5 to 27.5 wt.-%, more preferably from 20.0 to 25.0 wt.-%;

an ethylene content of said soluble fraction C2(SF), as determined by FT-IR spectroscopy calibrated by quantitative $^{13}C$-NMR spectroscopy, in the range from 25.0 to 40.0 wt.-%, preferably from 27.5 to 37.5 wt.-%, more preferably from 27.5 to 36.5 wt.-%;

an intrinsic viscosity of said soluble fraction iV(SF), as measured in decalin according to DIN ISO 1628/1 at 135° C., of 2.0 dl/g to 3.5 dl/g, preferably of 2.3 to 3.0 dl/g, more preferably of 2.5 to 2.9 dl/g;

a ratio of the ethylene contents of the soluble fraction and crystalline fraction (C2(SF)/C2(CF)) of 11.0 to 15.0, preferably of 11.5 to 15.0, more preferably of 12.0 to 15.0; and a melt flow rate $MFR_2$ (230° C., 2.16 kg, ISO 1133) of 75 to 250 g/10 min, preferably 80 to 200 g/10 min, more preferably 85 to 180 g/10 min.

Further, the present invention relates to a process for preparing a polypropylene composition as described above or below wherein the heterophasic propylene copolymer (A) is polymerized in the presence of a Ziegler-Natta catalyst system in a multistage process comprising at least two polymerization reactors connected in series, and the heterophasic propylene copolymer (A) is blended with the particulate inorganic nucleating agent (B).

Still further, the present invention relates to an article, preferably a moulded article, more preferably an injection moulded article, still more preferably an injection moulded automotive article comprising the polypropylene composition as described above or below.

Finally, the present invention relates to the use of the polypropylene composition as described above or below for injection molding of articles, preferably automotive articles.

Definitions

Unless defined otherwise, all technical and scientific terms used herein have the same meaning as commonly understood by one of ordinary skill in the art to which the invention pertains. Although, any methods and materials similar or equivalent to those described herein can be used in practice for testing of the present invention, the preferred materials and methods are described herein. In describing and claiming the present invention, the following terminology will be used in accordance with the definitions set out below. Unless clearly indicated otherwise, use of the terms "a," "an," and the like refers to one or more.

A polymer blend is a mixture of two or more polymeric components. In general, the blend can be prepared by mixing the two or more polymeric components. A suitable mixing procedures known in the art is post-polymerization blending.

Post-polymerization blending can be dry blending of polymeric components such as polymer powders and/or compounded polymer pellets or melt blending by melt mixing the polymeric components.

A propylene homopolymer is a polymer, which essentially consists of propylene monomer units. Due to impurities especially during commercial polymerization processes a propylene homopolymer can comprise up to 0.1 mol % comonomer units, preferably up to 0.05 mol % comonomer units and most preferably up to 0.01 mol % comonomer units.

A polypropylene means a polymer being composed of units derived from propylene in an amount of more than 50 mol-%.

A polyethylene means a polymer being composed of units derived from ethylene in an amount of more than 50 mol-%.

The term "elastomer" denotes a natural or synthetic polymer having elastic properties. The term "plastomer" denotes a natural or synthetic polymer which combines qualities of elastomers and plastics, such as rubber-like properties with the processing ability of plastic. An ethylene based plastomer means a plastomer being composed of units derived from ethylene in an amount of more than 50 mol %.

The presence of a heterophasic nature can be easily determined by the number of glass transition points, like in dynamic-mechanical analysis (DMA), and/or high resolution microscopy, like scanning electron microscopy (SEM), transmission electron microscopy (TEM) or atomic force microscopy (AFM).

"Multimodal", like "bimodal" or "trimodal" describes a probability distribution that has several relative maxima. In particular, the expression "modality of a polymer" refers to the form of its molecular weight distribution (MWD) curve, i.e. the appearance of the graph of the polymer weight fraction as a function of its molecular weight. If the polymer is produced in a sequential step process, i.e. by utilizing reactors coupled in serial configuration, and using different conditions in each reactor, the different polymer fractions produced in the different reactors have each their own molecular weight distribution which may considerably differ from one another. The molecular weight distribution curve of the resulting final polymer can be seen as super-imposing of molecular weight distribution curves of the individual polymer fractions which will, accordingly, show distinct maxima, or at least be distinctively broadened compared with the curves for individual fractions. A polymer showing such molecular weight distribution curve is called bimodal, trimodal or multimodal, respectively.

A polymer, which is either polymerized in a single polymerization stage or in sequential step process using comparable polymerization conditions in each reactor usually shows a single maximum in its molecular weight distribution (MWD) curve. Such a polymer is identified as unimodal.

The term "XCS" refers to the xylene cold soluble fraction (XCS wt.-%) determined at 25° C. according to ISO 16152. The term "XCI" refers to the xylene cold insoluble fraction (XCI wt.-%) determined at 25° C. according to ISO 16152.

Reactor blend is a blend originating from the production in two or more reactors coupled in series or in a reactor having two or more reaction compartments. A reactor blend may alternatively result from blending in solution. A reactor blend stands in contrast to a compound as produced by melt extrusion.

If not indicated otherwise "%" refers to weight-% (wt.-%).

DETAILED DESCRIPTION

Composition

In a first aspect, the present invention relates to a polypropylene composition comprising
- (A) at least 95.0 wt.-%, such as from 95.0 to 99.9 wt.-%, preferably from 96.0 to 99.5 wt.-%, more preferably from 97.5 to 99.0 wt.-% of a heterophasic propylene copolymer; and
- (B) up to 1.5 wt.-%, such as from 0.01 to 1.5 wt.-%, preferably from 0.1 to 1.3 wt.-%, more preferably from 0.2 to 1.2 wt.-% of a particulate inorganic nucleating agent, whereby all percentages refer to the total composition, and whereby the heterophasic propylene copolymer (A) comprises a matrix phase and an elastomeric phase dispersed therein and the composition has
- a soluble fraction (SF) and a crystalline fraction (CF), determined according to CRYSTEX QC analysis;
- a soluble fraction (SF) content determined according to CRYSTEX QC analysis in the range from 15.0 wt.-% to 30.0 wt.-%, preferably from 17.5 to 27.5 wt.-%, more preferably from 20.0 to 25.0 wt.-%;
- an ethylene content of said soluble fraction C2(SF), as determined by FT-IR spectroscopy calibrated by quantitative $^{13}$C-NMR spectroscopy, in the range from 25.0 to 40.0 wt.-%, preferably from 27.5 to 37.5 wt.-%, more preferably from 27.5 to 36.5 wt.-%;
- an intrinsic viscosity of said soluble fraction iV(SF), as measured in decalin according to DIN ISO 1628/1 at 135° C., of 2.0 dl/g to 3.5 dl/g, preferably of 2.3 to 3.0 dl/g, more preferably of 2.5 to 2.9 dl/g;
- a ratio of the ethylene contents of the soluble fraction and crystalline fraction (C2(SF)/C2(CF)) of 11.0 to 15.0, preferably of 11.5 to 15.0, more preferably of 12.0 to 15.0;
- a melt flow rate $MFR_2$ (230° C., 2.16 kg, ISO 1133) of 75 to 250 g/10 min, preferably 80 to 200 g/10 min, more preferably 85 to 180 g/10 min.

The composition suitable for automotive application according to the present invention has one or more of the following characteristics:

The composition has a melt flow rate $MFR_2$ (230° C., 2.16 kg, ISO 1133) of 75 to 250 g/10 min, preferably 80 to 200 g/10 min, more preferably 85 to 180 g/10 min.

The composition can be characterized by CRYSTEX QC analysis. In the CRYSTEX QC analysis a crystalline fraction (CF) and a soluble fraction (SF) are obtained which can be quantified and analyzed in regard of the monomer and comonomer content as well as the intrinsic viscosity (iV). Thereby, the crystalline fraction (CF) represents the crystalline part of the polypropylene composition, such as the matrix phase of the heterophasic propylene copolymer. The soluble fraction (SF) represents the amorphous part of the polypropylene composition, such as the elastomeric phase of the heterophasic propylene copolymer.

The composition has a soluble fraction (SF) and a crystalline fraction (CF), determined according to CRYSTEX QC analysis.

The composition preferably shows one or all of the following properties in the CRYSTEX QC analysis:
- a crystalline fraction (CF) content determined according to CRYSTEX QC analysis in the range from 70.0 to 85.0 wt.-%, more preferably 72.5 to 82.5 wt.-%, still more preferably 75.0 to 80.0 wt.-%, and
- a soluble fraction (SF) content determined according to CRYSTEX QC analysis in the range from 15.0 wt.-% to 30.0 wt.-%, preferably from 17.5 to 27.5 wt.-%, more preferably from 20.0 to 25.0 wt.-%.

Said crystalline fraction (CF) preferably has one or more, preferably all of the following properties:
- an ethylene content (C2(CF)), as determined by FT-IR spectroscopy calibrated by quantitative $^{13}$C-NMR spectroscopy, of from 1.5 to 3.0 wt.-%, preferably of 1.8 to 2.8 wt.-%, more preferably of 2.0 to 2.7 wt.-%; and/or
- an intrinsic viscosity (iV(CF)), as measured in decalin according to DIN ISO 1628/1 at 135° C., of 0.7 to 1.7 dl/g, preferably of 0.8 to 1.5 dl/g, more preferably of 0.9 to 1.4 dl/g.

Said soluble fraction (SF) has one or more, preferably all of the following properties:
- an ethylene content (C2(SF)), as determined by FT-IR spectroscopy calibrated by quantitative $^{13}$C-NMR spectroscopy, in the range from 25.0 to 40.0 wt.-%, preferably from 27.5 to 37.5 wt.-%, more preferably from 27.5 to 36.5 wt.-%; and/or
- an intrinsic viscosity (iV(SF)), as measured in decalin according to DIN ISO 1628/1 at 135° C., of 2.0 dl/g to 3.5 dl/g, preferably of 2.3 to 3.0 dl/g, more preferably of 2.5 to 2.9 dl/g.

The polypropylene composition preferably comprises units derived from ethylene in a total amount of from 5.5 to 12.5 wt.-%, preferably of 6.0 to 12.0 wt.-%, more preferably of 6.5 to 11.5 wt.-%, as determined by FT-IR spectroscopy calibrated by quantitative $^{13}$C-NMR spectroscopy.

The ratio of the intrinsic viscosities of the soluble fraction and crystalline fraction (iV(SF)/iV(CF)) is preferably in the range of from 2.2 to 3.0, more preferably in the range of from 2.4 to 2.9, still more preferably in the range of from 2.6 to 2.8.

The ratio of the ethylene contents of the soluble fraction and crystalline fraction (C2(SF)/C2(CF)) is in the range of from 11.0 to 15.0, preferably in the range of from 11.5 to 15.0, more preferably in the range of from 12.0 to 15.0.

It is preferred that the polymeric components of the polypropylene composition consist of propylene units and ethylene units only.

Although not measured directly, the content of units derived from propylene (C3) in the soluble fraction (SF) preferably adds up to 100 wt.-% with the content of units derived from ethylene (C2) in the soluble fraction (SF).

The content of units derived from propylene (C3) in the soluble fraction (SF) is preferably in the range from 60.0 to 75.0 wt.-%, more preferably from 62.5 to 72.5 wt.-%, still more preferably from 63.5 to 72.5 wt.-%.

Although not measured directly, the content of units derived from propylene (C3) in the crystalline fraction (CF) preferably adds up to 100 wt.-% with the content of units derived from ethylene (C2) in the crystalline fraction (CF).

The content of units derived from propylene (C3) in the crystalline fraction (CF) is preferably in the range from 97.0 to 98.5 wt.-%, more preferably from 97.2 to 98.2 wt.-%, still more preferably from 98.0 to 98.3 wt.-%.

The total content of units derived from propylene (C3) polypropylene composition is preferably 87.5 to 94.5 wt.-%, more preferably 88.0 to 94.0 wt.-%, still more preferably 88.5 to 93.5 wt.-%.

The specifics especially of the soluble fraction (SF) preferably result in a specific morphology of the elastomeric phase dispersed in the matrix phase of the heterophasic propylene copolymer. The elastomeric phase can be identified as particles in the matrix phase, e.g. during microscopy.

The particles of the elastomeric phase dispersed in the matrix phase preferably have a number average particle size of from 1150 to 1325 nm, preferably from 1175 to 1300 nm, more preferably from 1200 to 1275 nm.

The polypropylene composition preferably has a melt temperature Tm of from 155 to 175° C., more preferably from 157 to 172° C., still more preferably from 160 to 170° C.

Further, the polypropylene composition preferably has a crystallization temperature Tc of from 120 to 140° C., more preferably from 122 to 137° C., still more preferably from 125 to 135° C.

Still further, the polypropylene composition preferably has a heat deflection temperature HDT B of from 92 to 110° C., more preferably from 93 to 108° C., still more preferably from 95 to 105° C.

The polypropylene composition according to the invention preferably shows a superior balance of properties in regard of flowability, as can be seen from the melt flow rate described above, impact properties and especially mechanical properties, such as in in regard of the tensile properties.

The polypropylene composition preferably has a tensile modulus of from 1250 MPa to 1600 MPa, more preferably from 1300 to 1550 MPa, more preferably from 1300 to 1520 MPa.

Still further, the polypropylene composition preferably has a tensile elongation at break of from 4.0 to 25.0%, more preferably from 4.5 to 20.0%, still more preferably from 4.7 to 17.5%.

Further, the polypropylene composition preferably has a Charpy Notched Impact Strength at 23° C. (CNIS at 23° C.) of from 2.5 to 6.4 kJ/m$^2$, more preferably from 2.7 to 6.0 kJ/m$^2$.

Further, the composition preferably has a Charpy Notched Impact Strength at −20° C. (CNIS at −20° C.) of from 2.0 to 5.5 kJ/m$^2$, more preferably from 2.3 to 5.0 kJ/m$^2$.

Still more preferably, the composition has good impact strength in the instrumented puncture test:

The composition preferably has a puncture energy, measured at 23° C., of from 4.5 to 20.0 J, preferably from 5.0 to 15.0 J.

Further, the composition preferably has a puncture energy, measured at −20° C., of from 3.5 to 15.0 J, preferably from 4.0 to 12.0 J.

The polypropylene composition comprises a heterophasic propylene copolymer (A) in an amount of at least 95.0 wt.-%, such as from 95.0 to 99.9 wt.-%, preferably from 96.0 to 99.5 wt.-%, more preferably from 97.5 to 99.0 wt.-%, based on the total weight of the polypropylene composition.

The heterophasic propylene copolymer (A) preferably has one or more, preferably all of the following properties:
- a melt flow rate $MFR_2$ (230° C., 2.16 kg, ISO 1133) of 75 to 250 g/10 min, preferably 80 to 200 g/10 min, more preferably 85 to 180 g/10 min; and/or
- a total content of units derived from ethylene (C2) of 5.5 to 12.5 wt.-%, preferably of 6.0 to 12.0 wt.-%, more preferably of 6.5 to 11.5 wt.-%, as determined by FT-IR spectroscopy calibrated by quantitative $^{13}$C-NMR spectroscopy; and/or
- a melt temperature Tm of from 155 to 175° C., more preferably from 157 to 172° C., still more preferably from 160 to 170° C., measured by differential scanning calorimetry (DSC) according to ISO 11357/part 3/method C2; and/or
- a crystallization temperature Tc of from 120 to 140° C., more preferably from 122 to 137° C., still more preferably from 125 to 135° C., measured by differential scanning calorimetry (DSC) according to ISO 11357/part 3/method C2; and/or
- a xylene cold solubles (XCS) fraction, as determined at 25° C. according ISO 16152; first edition; 2005-07-01, of from 12.5 to 30.0 wt.-%, preferably from 15.0 to 27.5 wt.-%, more preferably from 17.5 to 25.0 wt.-%, based on the total weight of the heterophasic propylene copolymer (A); and/or
- an ethylene content of said XCS fraction (C2(XCS)) of 22.5 to 50.0 wt.-%, more preferably of 25.0 to 47.5 wt.-%, still more preferably of 27.5 to 45.0 wt.-%, as determined by FT-IR spectroscopy calibrated by quantitative $^{13}$C-NMR spectroscopy; and/or
- an intrinsic viscosity of said XCS fraction iV(XCS), as measured in decalin according to DIN ISO 1628/1 at 135° C. of 3.0 to 4.5 dl/g, preferably of 3.1 to 4.2 dl/g, more preferably of 3.2 to 4.0 dl/g.

Further, the polypropylene composition comprises a particulate inorganic nucleating agent (B) in an amount of up to 1.5 wt.-%, such as from 0.01 to 1.5 wt.-%, preferably from 0.1 to 1.3 wt.-%, more preferably from 0.2 to 1.2 wt.-%, based on the total weight of the polypropylene composition.

The particulate inorganic nucleating agent (B) preferably is talc.

The particulate inorganic nucleating agent (B) preferably has a median particle size $d_{50}$ before compounding of 0.5 to 7.5 micrometers, preferably 1.0 to 5.0 micrometers.

Further, the particulate inorganic nucleating agent (B) preferably has a top-cut particle size $d_{95}$ before compounding of 2.0 to 20.0 micrometers, preferably 3.0 to 15.0 micrometers.

The composition preferably further comprises additives in an amount of up to 3.0 wt %, more preferably in an amount of from 0.1 to 3.0 wt %, still more preferably in an amount of from 0.5 to 2.5 wt %, based on the total weight of the composition. Typically additives would be selected from antioxidants, anti-slip agents, nucleating agents different from the particulate inorganic nucleating agent (B), anti-scratch agents, anti-scorch agents, metal deactivators, UV-stabilisers, acid scavengers, lubricants, anti-static agents, pigments and the like, as well as combinations thereof. These additives are well known in the polymer industry and their use will be familiar to the skilled practitioner. Any additives, which are present, may be added as an isolated raw material or in a mixture with a carrier polymer, i.e. in a so-called master batch.

The polypropylene composition can comprise other components than the heterophasic propylene copolymer (A), the particulate inorganic nucleating agent (B) and the optional additives, such as further polymeric components in small amounts of e.g. up to 3.0 wt %.

It is however preferred that the polypropylene composition consists of the heterophasic propylene copolymer (A), the particulate inorganic nucleating agent (B) and the optional additives.

Process

In another aspect the present invention relates to a process for preparing a polypropylene composition as described above or below wherein the heterophasic propylene copolymer (A) is polymerized in the presence of a Ziegler-Natta catalyst system in a multistage process comprising at least two polymerization reactors connected in series, and the heterophasic propylene copolymer (A) is blended with the particulate inorganic nucleating agent.

In the multistage process a propylene homopolymer is produced in at least one first polymerization step and in at least one subsequent polymerization step a propylene ethylene copolymer is produced in the presence of said propylene homopolymer or by blending the propylene homopolymer with the propylene ethylene copolymer after their polymerization.

In a particular preferred embodiment the propylene homopolymer matrix is produced at least in a slurry phase reactor and subsequently the propylene ethylene copolymer is produced at least in a gas phase reactor.

Accordingly the heterophasic propylene copolymer can be typically produced in a cascade of at least 2 reactors, preferably at least 3 reactors, more preferably at least 4 reactors, where the first reactor is a liquid bulk reactor preferably of loop design and all subsequent reactors are gas phase reactors, preferably of fluidized bed design. The number of subsequent reactors is typically not more than 6, preferably not more than 5. Preferably the heterophasic propylene copolymer is produced in a cascade of 4 reactors.

A preferred multistage process is a "loop-gas phase"-process, as developed by *Borealis* (known as BORSTAR® technology) and is described e.g. in patent literature, such as in EP 0 887 379, WO 92/12182 WO 2004/000899, WO 2004/111095, WO 99/24478, WO 99/24479 or in WO 00/68315.

A further suitable slurry-gas phase process is the Spheripol® process of Basell.

Preferably the components produced in the first two reactors are crystallizable propylene homopolymers, while the component produced in subsequent third and fourth reactor is a predominantely amorphous propylene ethylene copolymer with higher amounts of ethylene comonomer.

In the case that the propylene homopolymer and/or the propylene ethylene copolymer are polymerized in more than one polymerization reactor, such as in two subsequent polymerization reactors, it is preferred that the polymerization conditions are adapted as such that comparable propylene homopolymer fractions and/or propylene ethylene copolymer fractions are produced.

It is preferred that the propylene homopolymer is unimodal.

It is further preferred that the propylene ethylene copolymer is unimodal.

In a preferred embodiment the process comprises the steps of
a) Polymerizing propylene in the presence of the Ziegler-Natta catalyst system in a first polymerization reactor for producing a first propylene homopolymer fraction;

b) Transferring a polymerization mixture comprising the Ziegler-Natta catalyst system and the first propylene homopolymer fraction from the first polymerization reactor to a second polymerization reactor;
c) Polymerizing propylene in the presence of the Ziegler-Natta catalyst system in the second polymerization reactor for producing a second propylene homopolymer fraction;
d) Transferring a polymerization mixture comprising the Ziegler-Natta catalyst system and the first and second propylene homopolymer fractions from the second polymerization reactor to a third polymerization reactor;
e) Polymerizing propylene and ethylene in the presence of the Ziegler-Natta catalyst system in the third polymerization reactor for producing a first propylene-ethylene copolymer fraction;
f) Transferring a polymerization mixture comprising the Ziegler-Natta catalyst system, the first and second propylene homopolymer fractions and the first propylene-ethylene copolymer fraction from the third polymerization reactor to a fourth polymerization reactor;
g) Polymerizing propylene and ethylene in the presence of the Ziegler-Natta catalyst system in the fourth polymerization reactor for producing a second propylene-ethylene copolymer fraction;
h) Withdrawing a polymerization mixture comprising the Ziegler-Natta catalyst system, the first and second propylene homopolymer fractions and the first and second propylene-ethylene copolymer fractions from the fourth polymerization reactor; and
i) Obtaining the heterophasic propylene copolymer (A) comprising the first and second propylene homopolymer fractions and the first and second propylene-ethylene copolymer fractions;
j) Blending the heterophasic propylene copolymer (A) with the particulate inorganic nucleating agent (B).

The first polymerization reactor preferably is a slurry phase reactor, such as a loop reactor.

It is preferred that the operating temperature in the first polymerization reactor, preferably the loop reactor, is in the range from 62 to 85° C., more preferably in the range from 65 to 82° C., still more preferably in the range from 67 to 80° C.

Typically, the pressure in the first polymerization reactor, preferably in the loop reactor, is in the range from 20 to 80 bar, preferably 30 to 70 bar, like 35 to 65 bar.

It is preferred that in the first polymerization reactor, preferably the loop reactor, a propylene homopolymer is produced. Thus, it is preferred that the first propylene polymer fraction is a first propylene homopolymer fraction.

Preferably hydrogen is added in the first polymerization reactor in order to control the molecular weight, i.e. the melt flow rate $MFR_2$.

Preferably the hydrogen to propylene ratio (H2/C3 ratio) in the first polypropylene reactor, preferably the loop reactor, is in the range from 20 to 50 mol/kmol, more preferably 30 to 40 mol/kmol.

Due to the high amount of hydrogen, the melt flow rate of the first propylene polymer fraction is very high.

It is preferred that the first propylene polymer fraction has a melt flow rate $MFR_2$ (230° C., 2.16 kg, ISO 1133) in the range of 50 to 1000 g/10 min, preferably in the range of 150 to 850 g/10 min, more preferably in the range of 300 to 700 g/10 min.

The second polymerization reactor preferably is a first gas phase reactor, such as a first fluidized bed gas phase reactor.

It is preferred that the operating temperature in the second polymerization reactor, preferably the first gas phase reactor, is in the range from 75 to 95° C., more preferably in the range from 78 to 92° C.

Typically, the pressure in the second polymerization reactor, preferably in the first gas phase reactor, is in the range from 5 to 50 bar, preferably 15 to 40 bar.

It is preferred that in the second polymerization reactor, preferably the first gas phase reactor, a propylene homopolymer is produced. Thus, it is preferred that the second propylene polymer fraction is a second propylene homopolymer fraction.

Preferably hydrogen is added in the second polymerization reactor in order to control the molecular weight, i.e. the melt flow rate $MFR_2$.

Preferably the hydrogen to propylene ratio (H2/C3 ratio) in the second polypropylene reactor, preferably the first gas phase reactor, is in the range from 150 to 500 mol/kmol, more preferably 200 to 350 mol/kmol.

Due to the high amount of hydrogen, the melt flow rate of the combined first and second propylene polymer fractions is very high.

It is preferred that the combined first and second propylene polymer fractions have a melt flow rate $MFR_2$ (230° C., 2.16 kg, ISO 1133) in the range of 50 to 1000 g/10 min, preferably in the range of 150 to 850 g/10 min, more preferably in the range of 300 to 700 g/10 min.

The third polymerization reactor preferably is a second gas phase reactor, such as a second fluidized bed gas phase reactor.

It is preferred that the operating temperature in the third polymerization reactor, preferably the second gas phase reactor, is in the range from 65 to 85° C., more preferably in the range from 68 to 82° C. Typically, the operating temperature in third polymerization reactor is lower than the operating temperature in the second polymerization reactor.

Typically, the pressure in the third polymerization reactor, preferably in the second gas phase reactor, is in the range from 5 to 40 bar, preferably 10 to 30 bar.

In the third polymerization reactor, preferably the second gas phase reactor, a propylene ethylene copolymer is produced. Thus, the third propylene polymer fraction is a first propylene ethylene copolymer fraction.

The ethylene to propylene ratio (C2/C3 ratio) in the third polymerization polymerization reactor, preferably the second gas phase reactor, is in the range from 200 to 500 mol/kmol, more preferably 250 to 475 mol/kmol.

Due to the high ethylene to propylene ratio (C2/C3 ratio) the third propylene polymer fraction preferably is an elastomeric block copolymer with propylene rich sections and ethylene rich sections.

Preferably hydrogen is added in the third polymerization reactor in order to control the molecular weight, i.e. the melt flow rate $MFR_2$.

Preferably, the hydrogen to ethylene ratio (H2/C2 ratio) in the third polymerization reactor, preferably the second gas phase reactor, is in the range from 20 to 100 mol/kmol, more preferably 30 to 75 mol/kmol.

It is preferred that the combined first, second and third propylene polymer fractions have a melt flow rate $MFR_2$ (230° C., 2.16 kg, ISO 1133) in the range of 30 to 500 g/10 min, preferably in the range of 65 to 350 g/10 min, more preferably in the range of 75 to 250 g/10 min.

The fourth polymerization reactor preferably is a third gas phase reactor, such as a third fluidized bed gas phase reactor.

It is preferred that the operating temperature in the fourth polymerization reactor, preferably the third gas phase reactor, is in the range from 65 to 85° C., more preferably in the range from 68 to 82° C. Typically, the operating temperature in fourth polymerization reactor is lower than the operating temperature in the second polymerization reactor.

Typically, the pressure in the fourth polymerization reactor, preferably in the third gas phase reactor, is in the range from 5 to 40 bar, preferably 10 to 30 bar.

In the fourth polymerization reactor, preferably the third gas phase reactor, a propylene ethylene copolymer is produced. Thus, the fourth propylene polymer fraction is a second propylene ethylene copolymer fraction.

The ethylene to propylene ratio (C2/C3 ratio) in the fourth polymerization polymerization reactor, preferably the third gas phase reactor, is in the range from 150 to 650 mol/kmol, more preferably 250 to 500 mol/kmol.

Due to the high ethylene to propylene ratio (C2/C3 ratio) the fourth propylene polymer fraction preferably is an elastomeric block copolymer with propylene rich sections and ethylene rich sections.

Preferably hydrogen is added in the fourth polymerization reactor in order to control the molecular weight, i.e. the melt flow rate $MFR_2$.

Preferably, the hydrogen to ethylene ratio (H2/C2 ratio) in the fourth polymerization reactor, preferably the third gas phase reactor, is in the range from 50 to 250 mol/kmol, more preferably 80 to 175 mol/kmol.

It is preferred that the combined first, second, third and fourth propylene polymer fractions have a melt flow rate $MFR_2$ (230° C., 2.16 kg, ISO 1133) in the range of 75 to 250 g/10 min, preferably 80 to 200 g/10 min, more preferably 85 to 180 g/10 min.

Further the combined first, second, third and fourth propylene polymer fractions preferably have a total comonomer content, preferably ethylene (C2) content in the range of 5.5 to 12.5 wt.-%, preferably of 6.0 to 12.0 wt.-%, more preferably of 6.5 to 11.5 wt.-%, based on the total weight of the combined first, second, third and fourth propylene polymer fractions, as determined by FT-IR spectroscopy calibrated by quantitative $^{13}$C-NMR spectroscopy.

The combined first, second, third and fourth propylene polymer fractions preferably form a heterophasic propylene copolymer.

The preparation of the first, second, third and fourth propylene polymer fractions can comprise in addition to the (main) polymerization stages in the at least four polymerization reactors prior thereto a pre-polymerization in a pre-polymerization reactor upstream to the first polymerization reactor.

In the pre-polymerization reactor, a polypropylene is produced. The pre-polymerization is preferably conducted in the presence of the Ziegler-Natta catalyst system. According to this embodiment, the Ziegler-Natta catalyst system is introduced to the pre-polymerization step. However, this shall not exclude the option that at a later stage for instance further co-catalyst is added in the polymerization process, for instance in the first reactor. In one embodiment, all components of the Ziegler-Natta catalyst system are only added in the pre-polymerization reactor, if a pre-polymerization is applied.

The pre-polymerization reaction is typically conducted at a temperature of 0 to 60° C., preferably from 15 to 50° C., and more preferably from 20 to 45° C.

The pressure in the pre-polymerization reactor is not critical but must be sufficiently high to maintain the reaction mixture in liquid phase. Thus, the pressure may be from 20 to 100 bar, for example 30 to 70 bar.

In a preferred embodiment, the pre-polymerization is conducted as bulk slurry polymerization in liquid propylene, i.e. the liquid phase mainly comprises propylene, optionally with inert components dissolved therein.

It is possible to add other components also to the pre-polymerization stage. Thus, hydrogen may be added into the pre-polymerization stage to control the molecular weight of the polypropylene as is known in the art. Further, antistatic additives may be used to prevent the particles from adhering to each other or to the walls of the reactor.

The precise control of the pre-polymerization conditions and reaction parameters is within the skill of the art.

Due to the above defined process conditions in the pre-polymerization, preferably a mixture of the Ziegler-Natta catalyst system and the polypropylene produced in the pre-polymerization reactor is obtained. Preferably, the Ziegler-Natta catalyst system is (finely) dispersed in the polypropylene. In other words, the Ziegler-Natta catalyst system introduced in the pre-polymerization reactor are split into smaller fragments that are evenly distributed within the growing polypropylene. The sizes of the introduced Ziegler-Natta catalyst system as well as of the obtained fragments are not of essential relevance for the instant invention and within the skilled knowledge.

As mentioned above, if a pre-polymerization is used, subsequent to said pre-polymerization, the mixture of the Ziegler-Natta catalyst system and the polypropylene produced in the pre-polymerization reactor is transferred to the first polymerization reactor. Typically the total amount of the polypropylene produced in the pre-polymerization reactor in the first, second and third propylene polymer fractions is rather low and typically not more than 5.0 wt.-%, more preferably not more than 4.0 wt.-%, still more preferably in the range from 0.5 to 4.0 wt.-%, like in the range 1.0 of to 3.0 wt.-%.

In case that pre-polymerization is not used, propylene and the other ingredients such as the Ziegler-Natta catalyst system are directly introduced into the first polymerization reactor.

The residence times of the polymerization mixtures in the different polymerization stages are adjusted to obtain the amounts of the first, second, third and fourth polymer fractions in the combined first, second, third and fourth polymer fractions.

Preferably the first propylene polymer fraction is present in an amount of from 35 to 55 wt.-%, more preferably from 40 to 50 wt.-%, based on the total weight of the combined first, second, third and fourth propylene polymer fractions. The amount of the polypropylene produced in the pre-polymerization reactor, if present, is generally added to the amount of the first propylene polymer fraction.

Preferably the second propylene polymer fraction is present in an amount of from 25 to 45 wt.-%, more preferably from 30 to 40 wt.-%, based on the total weight of the combined first, second, third and fourth propylene polymer fractions.

Preferably the third propylene polymer fraction is present in an amount of from 5 to 20 wt.-%, more preferably from 10 to 15 wt.-%, based on the total weight of the combined first, second, third and fourth propylene polymer fractions.

Preferably the fourth propylene polymer fraction is present in an amount of from 3 to 15 wt.-%, more preferably from 5 to 10 wt.-%, based on the total weight of the combined first, second, third and fourth propylene polymer fractions.

According to the invention the heterophasic propylene copolymer (A) is obtained by a multistage polymerization process, as described above, in the presence of a Ziegler-Natta catalyst system.

As pointed out above in the specific process for the preparation of the heterophasic propylene copolymer (A) as defined above, a specific Ziegler-Natta catalyst is preferably used.

Accordingly, the Ziegler-Natta catalyst system will be now described in more detail. The catalyst used in the present invention is a solid Ziegler-Natta catalyst, which comprises compounds of a transition metal of Group 4 to 6 of IUPAC, like titanium, a Group 2 metal compound, like a magnesium, and an internal donor being preferably a non-phthalic compound, more preferably a non-phthalic acid ester, still more preferably being a diester of non-phthalic dicarboxylic acids as described in more detail below. Thus, the catalyst is fully free of undesired phthalic compounds. Further, the solid catalyst is free of any external support material, like silica or MgCl2, but the catalyst is self-supported.

The Ziegler-Natta catalyst (ZN—C) can be further defined by the way as obtained.

Accordingly, the Ziegler-Natta catalyst (ZN—C) is preferably obtained by a process comprising the steps of a)
- $a_1$) providing a solution of at least a Group 2 metal alkoxy compound (Ax) being the reaction product of a Group 2 metal compound and a monohydric alcohol (A) comprising in addition to the hydroxyl moiety at least one ether moiety optionally in an organic liquid reaction medium; or
- $a_2$) a solution of at least a Group 2 metal alkoxy compound (Ax') being the reaction product of a Group 2 metal compound and an alcohol mixture of the monohydric alcohol (A) and a monohydric alcohol (B) of formula ROH, optionally in an organic liquid reaction medium; or
- $a_3$) providing a solution of a mixture of the Group 2 alkoxy compound (Ax) and a Group 2 metal alkoxy compound (Bx) being the reaction product of a Group 2 metal compound and the monohydric alcohol (B), optionally in an organic liquid reaction medium; or
- $a_4$) providing a solution of Group 2 alkoxide of formula $M(OR_1)_n(OR_2)_m X_{2-n-m}$ or mixture of Group 2 alkoxides $M(OR_1)_n X_{2-n}$, and $M(OR_2)_m X_{2-m}$, where M is Group 2 metal, X is halogen, $R_1$ and $R_2$ are different alkyl groups of $C_2$ to $C_{16}$ carbon atoms, and $0 \leq n < 2$, $0 \leq m \leq 2$ and $n+m+(2-n-m)=2$, provided that both n and $m \neq 0$, $0 < n' \leq 2$ and $0 < m' \leq 2$; and b) adding said solution from step a) to at least one compound of a transition metal of Group 4 to 6 and c) obtaining the solid catalyst component particles, and adding an internal electron donor, preferably a non-phthalic internal donor, at any step prior to step c).

The internal donor or precursor thereof is added preferably to the solution of step a).

According to the procedure above the Ziegler-Natta catalyst can be obtained via precipitation method or via emulsion (liquid/liquid two-phase system)-solidification method depending on the physical conditions, especially temperature used in steps b) and c).

In both methods (precipitation or emulsion-solidification) the catalyst chemistry is the same.

In precipitation method combination of the solution of step a) with at least one transition metal compound in step b) is carried out and the whole reaction mixture is kept at least at 50° C., more preferably in the temperature range of 55° C. to 110° C., more preferably in the range of 70° C. to 100° C., to secure full precipitation of the catalyst component in form of a solid particles (step c).

In emulsion-solidification method in step b) the solution of step a) is typically added to the at least one transition metal compound at a lower temperature, such as from −10 to below 50° C., preferably from −5 to 30° C. During agitation of the emulsion the temperature is typically kept at −10 to below 40° C., preferably from −5 to 30° C. Droplets of the dispersed phase of the emulsion form the active catalyst composition. Solidification (step c) of the droplets is suitably carried out by heating the emulsion to a temperature of 70 to 150° C., preferably to 80 to 110° C.

The catalyst prepared by emulsion-solidification method is preferably used in the present invention.

In a preferred embodiment in step a) the solution of $a_2$) or $a_3$) are used, i.e. a solution of (Ax') or a solution of a mixture of (Ax) and (Bx).

Preferably the Group 2 metal is magnesium.

The magnesium alkoxy compounds (Ax), (Ax') and (Bx) can be prepared in situ in the first step of the catalyst preparation process, step a), by reacting the magnesium compound with the alcohol(s) as described above, or said magnesium alkoxy compounds can be separately prepared magnesium alkoxy compounds or they can be even commercially available as ready magnesium alkoxy compounds and used as such in the catalyst preparation process of the invention.

Illustrative examples of alcohols (A) are monoethers of dihydric alcohols (glycol monoethers). Preferred alcohols (A) are $C_2$ to $C_4$ glycol monoethers, wherein the ether moieties comprise from 2 to 18 carbon atoms, preferably from 4 to 12 carbon atoms. Preferred examples are 2-(2-ethylhexyloxy)ethanol, 2-butyloxy ethanol, 2-hexyloxy ethanol and 1,3-propylene-glycol-monobutyl ether, 3-butoxy-2-propanol, with 2-(2-ethylhexyloxy)ethanol and 1,3-propylene-glycol-monobutyl ether, 3-butoxy-2-propanol being particularly preferred.

Illustrative monohydric alcohols (B) are of formula ROH, with R being straight-chain or branched $C_6$-$C_{10}$ alkyl residue. The most preferred monohydric alcohol is 2-ethyl-1-hexanol or octanol.

Preferably a mixture of Mg alkoxy compounds (Ax) and (Bx) or mixture of alcohols (A) and (B), respectively, are used and employed in a mole ratio of Bx:Ax or B:A from 8:1 to 2:1, more preferably 5:1 to 3:1.

Magnesium alkoxy compound may be a reaction product of alcohol(s), as defined above, and a magnesium compound selected from dialkyl magnesiums, alkyl magnesium alkoxides, magnesium dialkoxides, alkoxy magnesium halides and alkyl magnesium halides. Alkyl groups can be a similar or different $C_1$-$C_{20}$ alkyl, preferably $C_2$-$C_{10}$ alkyl. Typical alkyl-alkoxy magnesium compounds, when used, are ethyl magnesium butoxide, butyl magnesium pentoxide, octyl magnesium butoxide and octyl magnesium octoxide. Preferably the dialkyl magnesiums are used. Most preferred dialkyl magnesiums are butyl octyl magnesium or butyl ethyl magnesium.

It is also possible that magnesium compound can react in addition to the alcohol (A) and alcohol (B) also with a polyhydric alcohol (C) of formula $R''(OH)_m$ to obtain said magnesium alkoxide compounds. Preferred polyhydric alcohols, if used, are alcohols, wherein R" is a straight-chain, cyclic or branched $C_2$ to $C_{10}$ hydrocarbon residue, and m is an integer of 2 to 6.

The magnesium alkoxy compounds of step a) are thus selected from the group consisting of magnesium dialkoxides, diaryloxy magnesiums, alkyloxy magnesium halides, aryloxy magnesium halides, alkyl magnesium alkoxides, aryl magnesium alkoxides and alkyl magnesium aryloxides. In addition a mixture of magnesium dihalide and a magnesium dialkoxide can be used.

The solvents to be employed for the preparation of the present catalyst may be selected among aromatic and aliphatic straight chain, branched and cyclic hydrocarbons with 5 to 20 carbon atoms, more preferably 5 to 12 carbon atoms, or mixtures thereof. Suitable solvents include benzene, toluene, cumene, xylol, pentane, hexane, heptane, octane and nonane. Hexanes and pentanes are particular preferred.

Mg compound is typically provided as a 10 to 50 wt % solution in a solvent as indicated above. Typical commercially available Mg compound, especially dialkyl magnesium solutions are 20-40 wt % solutions in toluene or heptanes.

The reaction for the preparation of the magnesium alkoxy compound may be carried out at a temperature of 40° to 70° C. Most suitable temperature is selected depending on the Mg compound and alcohol(s) used.

The transition metal compound of Group 4 to 6 is preferably a titanium compound, most preferably a titanium halide, like $TiCl_4$.

The non-phthalic internal donor used in the preparation of the catalyst used in the present invention is preferably selected from (di)esters of non-phthalic carboxylic (di)acids, 1,3-diethers, derivatives and mixtures thereof. Especially preferred donors are diesters of mono-unsaturated dicarboxylic acids, in particular esters belonging to a group comprising malonates, maleates, succinates, citraconates, glutarates, cyclohexene-1,2-dicarboxylates and benzoates, and any derivatives and/or mixtures thereof. Preferred examples are e.g. substituted maleates and citraconates, most preferably citraconates.

In emulsion method, the two phase liquid-liquid system may be formed by simple stirring and optionally adding (further) solvent(s) and additives, such as the turbulence minimizing agent (TMA) and/or the emulsifying agents and/or emulsion stabilizers, like surfactants, which are used in a manner known in the art for facilitating the formation of and/or stabilize the emulsion. Preferably, surfactants are acrylic or methacrylic polymers. Particular preferred are unbranched $C_{12}$ to $C_{20}$ (meth)acrylates such as poly(hexadecyl)-methacrylate and poly(octadecyl)-methacrylate and mixtures thereof. Turbulence minimizing agent (TMA), if used, is preferably selected from α-olefin polymers of α-olefin monomers with 6 to 20 carbon atoms, like polyoctene, polynonene, polydecene, polyundecene or polydodecene or mixtures thereof. Most preferable it is polydecene.

The solid particulate product obtained by precipitation or emulsion-solidification method may be washed at least once, preferably at least twice, most preferably at least three times with an aromatic and/or aliphatic hydrocarbons, preferably with toluene, heptane or pentane. The catalyst can further be dried, as by evaporation or flushing with nitrogen, or it can be slurried to an oily liquid without any drying step.

The finally obtained Ziegler-Natta catalyst is desirably in the form of particles having generally an average particle size range of 5 to 200 μm, preferably 10 to 100. Particles are compact with low porosity and have surface area below 20 $g/m^2$, more preferably below 10 $g/m^2$. Typically the amount of Ti is 1 to 6 wt %, Mg 10 to 20 wt % and donor 10 to 40 wt % of the catalyst composition.

Detailed description of preparation of catalysts is disclosed in WO 2012/007430, EP2610271, EP261027 and EP2610272 which are incorporated here by reference.

The Ziegler-Natta catalyst is used in association with an alkyl aluminum cocatalyst and preferably with external donors.

As further component in the instant polymerization process an external donor is preferably present. Suitable external donors include certain silanes, ethers, esters, amines, ketones, heterocyclic compounds and blends of these. It is especially preferred to use a silane. It is most preferred to use silanes of the general formula

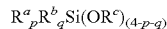

wherein $R^a$, $R^b$ and $R^c$ denote a hydrocarbon radical, in particular an alkyl or cycloalkyl group, and wherein p and q are numbers ranging from 0 to 3 with their sum p+q being equal to or less than 3. $R^a$, $R^b$ and $R^c$ can be chosen independently from one another and can be the same or different. Specific examples of such silanes are (tert-butyl)$_2Si(OCH_3)_2$, (cyclohexyl)(methyl)$Si(OCH_3)^2$, (phenyl)$_2Si(OCH_3)_2$ and (cyclopentyl)$_2Si(OCH_3)_2$, or of general formula

wherein $R^3$ and $R^4$ can be the same or different a represent a hydrocarbon group having 1 to 12 carbon atoms.

$R^3$ and $R^4$ are independently selected from the group consisting of linear aliphatic hydrocarbon group having 1 to 12 carbon atoms, branched aliphatic hydrocarbon group having 1 to 12 carbon atoms and cyclic aliphatic hydrocarbon group having 1 to 12 carbon atoms. It is in particular preferred that $R^3$ and $R^4$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl.

More preferably both $R^3$ and $R^4$ are the same, yet more preferably both $R^3$ and $R^4$ are an ethyl group.

Especially preferred external donors are the dicyclopentyl dimethoxy silane donor (D-donor) or the cyclohexylmethyl dimethoxy silane donor (C-Donor).

In addition to the Ziegler-Natta catalyst a co-catalyst has to be used, and the optional external donor can be used. The co-catalyst is preferably a compound of group 13 of the periodic table (IUPAC), e.g. organo aluminum, such as an aluminum compound, like aluminum alkyl, aluminum halide or aluminum alkyl halide compound.

Accordingly, in one specific embodiment the co-catalyst is a trialkylaluminium, like triethylaluminium (TEAL), dialkyl aluminium chloride or alkyl aluminium dichloride or mixtures thereof. In one specific embodiment the co-catalyst is triethylaluminium (TEAL).

Preferably the ratio between the co-catalyst (Co) and the external donor (ED) [Co/ED] and/or the ratio between the co-catalyst (Co) and the transition metal (TM) [Co/TM] should be carefully chosen.

Accordingly, (a) the mol-ratio of co-catalyst (Co) to external donor (ED) [Co/ED] must be in the range of 10 to 50, preferably is in the range of 15 to 40, more preferably is in the range of 15 to 35; and optionally (b) the mol-ratio of co-catalyst (Co) to titanium compound (TC) [Co/TC] must be in the range of above 50 to 350, preferably is in the range of 75 to 300, still more preferably is in the range of 100 to 275.

The first heterophasic propylene copolymer (A) according to this invention is preferably produced in the presence of
(a) a Ziegler-Natta catalyst comprising compounds (TC) of a transition metal of Group 4 to 6 of IUPAC, a Group 2 metal compound and an internal donor, wherein said internal donor is a non-phthalic compound, preferably is a non-phthalic acid ester and still more preferably is a diester of non-phthalic dicarboxylic acids;
(b) optionally a co-catalyst (Co), and
(c) optionally an external donor (ED).

It is preferred that the internal donor (ID) is selected from optionally substituted malonates, maleates, succinates, glutarates, cyclohexene-1,2-dicarboxylates, benzoates and derivatives and/or mixtures thereof, preferably the internal donor (ID) is a citraconate. Additionally or alternatively, the molar-ratio of co-catalyst (Co) to external donor (ED) [Co/ED] is 10 to 50.

It is preferred that an additional nucleating agent is introduced to the composition during the polymerization process of the heterophasic propylene copolymer (A). The additional nucleating agent is preferably a polymeric nucleating agent, which is preferably produced by polymerizing a vinyl compound. The additional nucleating agent is preferably introduced to the heterophasic propylene copolymer (A) by first polymerizing the vinyl compound, preferably vinylcycloalkane, as defined below, in the presence of the Ziegler-Natta catalyst system and the obtained reaction mixture of the polymer of the vinyl compound, preferably vinyl cyclohexane (VCH) polymer, and the catalyst system is then used for producing the heterophasic propylene copolymer (A). The above incorporation of the polymeric nucleating agent to the heterophasic propylene copolymer (A) during the polymerization of said heterophasic propylene copolymer (A) is called herein as BNT-technology.

With regard to the BNT-technology reference is made to the international applications WO 99/24478, WO 99/24479 and particularly WO 00/68315. According to this technology a catalyst system, preferably a Ziegler-Natta procatalyst, can be modified by polymerizing a vinyl compound in the presence of the catalyst system, comprising in particular the special Ziegler-Natta procatalyst, an external donor and a cocatalyst, which vinyl compound has the formula:
$CH_2=CH-CHR^1R^2$
wherein $R^1$ and $R^2$, together with the carbon atom they are attached to, form an optionally substituted saturated or unsaturated or aromatic ring or a fused ring system, wherein the ring or fused ring moiety contains four to 20 carbon atoms, preferably 5 to 12 membered saturated or unsaturated or aromatic ring or a fused ring system or independently represent a linear or branched $C_4$-$C_{30}$ alkane, $C_4$-$C_{20}$ cycloalkane or $C_4$-$C_{20}$ aromatic ring. Preferably $R^1$ and $R^2$, together with the C-atom wherein they are attached to, form a five- or six-membered saturated or unsaturated or aromatic ring or independently represent a lower alkyl group comprising from 1 to 4 carbon atoms. Preferred vinyl compounds for the preparation of a polymeric nucleating agent to be used in accordance with the present invention are in particular vinyl cycloalkanes, in particular vinyl cyclohexane (VCH), vinyl cyclopentane, and vinyl-2-methyl cyclohexane, 3-methyl-1-butene, 3-ethyl-1-hexene, 3-methyl-1-pentene, 4-methyl-1-pentene or mixtures thereof. VCH is a particularly preferred monomer.

The polymerized vinyl compound acts as an alpha-nucleating agent. The weight ratio of vinyl compound to solid catalyst component in the modification step of the catalyst is preferably of up to 5 (5:1), preferably up to 3 (3:1) most preferably from 0.5 (1:2) to 2 (2:1). The most preferred vinyl compound is vinylcyclohexane (VCH).

When an additional nucleating agent is introduced to the heterophasic propylene copolymer (A) during the polymerization process, the amount of additional nucleating agent present in the heterophasic propylene copolymer (A) is preferably not more than 500 ppm, more preferably not more than 200 ppm, still more preferably is in the range of 1.0 to 200 ppm, and most preferably is 5.0 to 100 ppm, based on the heterophasic propylene copolymer (A) and the additional nucleating agent, preferably based on the total weight of the polypropylene composition.

The heterophasic propylene copolymer (A) is blended with the particulate inorganic nucleating agent (B) and optional additives to produce the polypropylene composition. Thereby, the blending conditions are preferably in the usual range for blending such polypropylene compositions and can be easily adapted by one skilled in the art.

Article

In another aspect, the present invention relates to an article, preferably a moulded article, more preferably an injection moulded article, still more preferably an injection moulded automotive article comprising the polypropylene composition as described above or below.

The article preferably comprises the polypropylene composition in an amount of from 25 to 100 wt %.

In one embodiment the article preferably comprises the polypropylene composition in an amount of from 90 to 100 wt %, more preferably from 95 to 100 wt %.

In sad embodiment, the article preferably shows the same properties as described above or below for the polypropylene composition.

The article preferably shows high dimensional stability after processing, indicated in a low initial coefficient of linear thermal expansion (CLTE).

The article preferably has a coefficient of linear thermal expansion at a temperature range from +23 to +80° C. at a heating rate of 1° C./min in machine direction (CLTE 23-80° C., MD) of below 130 μm/m° C., preferably from 115 to 129 μm/m° C.

Still further, the article preferably has a coefficient of linear thermal expansion at a temperature range from +23 to +80° C. at a heating rate of 1° C./min in transverse direction (CLTE 23-80° C., TD) of below 145 μm/m° C., more preferably from 110 to 140 μm/m° C.

Further, the article preferably has a coefficient of linear thermal expansion at a temperature range from −30 to +80° C. at a heating rate of 1° C./min in machine direction (CLTE-30-80° C., MD) of below 115 μm/m° C., preferably from 100 to 114 μm/m° C.

Still further, the article preferably has a coefficient of linear thermal expansion at a temperature range from −30 to +80° C. at a heating rate of 1° C./min in transverse direction (CLTE-30-80° C., TD) of below 125 μm/m° C., preferably from 110 to 124 μm/m° C.

Due to the superior balance of properties the article qualifies for automotive articles. The articles very versatile and can be used for interior and exterior automotive applications.

Use

In yet another aspect the present invention relates to the use of the polypropylene composition as described above or below for injection molding of articles, preferably automotive articles.

Experimental Section

The following Examples are included to demonstrate certain aspects and embodiments of the invention as described in the claims. It should be appreciated by those of skill in the art, however, that the following description is illustrative only and should not be taken in any way as a restriction of the invention.

Test Methods a) CRYSTEX

Determination of Crystalline and Soluble Fractions and their Respective Properties (IV and Ethylene Content)

The crystalline (CF) and soluble fractions (SF) of the polypropylene (PP) compositions as well as the comonomer content and intrinsic viscosities of the respective fractions were analyzed by use of the CRYSTEX instrument, Polymer Char (Valencia, Spain). Details of the technique and the method can be found in literature (Ljiljana Jeremic, Andreas Albrecht, Martina Sandholzer & Markus Gahleitner (2020) Rapid characterization of high-impact ethylene-propylene copolymer composition by crystallization extraction separation: comparability to standard separation methods, International Journal of Polymer Analysis and Characterization, 25:8, 581-596)

The crystalline and amorphous fractions are separated through temperature cycles of dissolution at 160° C., crystallization at 40° C. and re-dissolution in 1,2,4-trichlorobenzene at 160° C. Quantification of SF and CF and determination of ethylene content (C2) are achieved by means of an integrated infrared detector (IR4) and for the determination of the intrinsic viscosity (iV) an online 2-capillary viscometer is used.

The IR4 detector is a multiple wavelength detector measuring IR absorbance at two different bands ($CH_3$ stretching vibration (centred at app. 2960 $cm^{-1}$) and the CH stretching vibration (2700-3000 $cm^{-1}$) that are serving for the determination of the concentration and the Ethylene content in Ethylene-Propylene copolymers. The IR4 detector is calibrated with series of 8 EP copolymers with known Ethylene content in the range of 2 wt.-% to 69 wt.-% (determined by $^{13}C$-NMR) and each at various concentrations, in the range of 2 and 13 mg/ml. To encounter for both features, concentration and ethylene content at the same time for various polymer concentrations expected during Crystex analyses the following calibration equations were applied:

$$Conc = a + b*Abs(CH) + c*(Abs(CH))^2 + \quad \text{(Equation 1)}$$
$$d*Abs(CH_3) + e*(Abs(CH_3))^2 + f*Abs(CH)*Abs(CH_3)$$

$$CH_3/1000C = a + b*Abs(CH) + c*Abs(CH_3) + \quad \text{(Equation 2)}$$
$$d*(Abs(CH_3)/Abs(CH)) + e*(Abs(CH_3)/Abs(CH))^2$$

The constants a to e for equation 1 and a to f for equation 2 were determined by using least square regression analysis.

The $CH_3/1000C$ is converted to the ethylene content in wt.-% using following relationship:

$$\text{wt.} - \% \text{ (Ethylene in } EP \text{ Copolymers)} = \quad \text{(Equation 3)}$$
$$100 - CH_3/1000TC*0.3$$

Amounts of Soluble Fraction (SF) and Crystalline Fraction (CF) are correlated through the XS calibration to the "Xylene Cold Soluble" (XCS) quantity and respectively Xylene Cold Insoluble (XCI) fractions, determined according to standard gravimetric method as per ISO16152. XS calibration is achieved by testing various EP copolymers with XS content in the range 2-31 wt.-%. The determined XS calibration is linear $$\text{wt.} - \% \ XS = 1,01 * \text{wt } \% \ SF \quad \text{(Equation 4)}$$

Intrinsic viscosity (iV) of the parent EP copolymer and its soluble and crystalline fractions are determined with a use of an online 2-capillary viscometer and are correlated to corresponding iV's determined by standard method in decalin according to ISO 1628-3. Calibration is achieved with various EP PP copolymers with iV=2-4 dL/g. The determined calibration curve is linear:

$$iV(\text{dL/g}) = a * Vsp/c \quad \text{(equation 5)}$$

The samples to be analyzed are weighed out in concentrations of 10 mg/ml to 20 mg/ml. To avoid injecting possible gels and/or polymers which do not dissolve in TCB at 160° C., like PET and PA, the weighed out sample was packed into a stainless steel mesh MW 0.077/D 0.05 mmm.

After automated filling of the vial with 1,2,4-TCB containing 250 mg/l 2,6-tert-butyl-4-methylphenol (BHT) as antioxidant, the sample is dissolved at 160° C. until complete dissolution is achieved, usually for 60 min, with constant stirring of 400 rpm. To avoid sample degradation, the polymer solution is blanketed with the N2 atmosphere during dissolution.

A defined volume of the sample solution is injected into the column filled with inert support where the crystallization of the sample and separation of the soluble fraction from the crystalline part is taking place. This process is repeated two times. During the first injection the whole sample is measured at high temperature, determining the iV [dl/g] and the C2 [wt.-%] of the PP composition. During the second injection the soluble fraction (at low temperature) and the crystalline fraction (at high temperature) with the crystallization cycle are measured (wt.-% SF, wt.-% C2, iV).

b) Xylene Cold Soluble Fraction (XCS, Wt %)

Xylene cold soluble fraction (XCS) was determined at 25° C. according ISO 16152; first edition; 2005-07-01. The part which remains insoluble is the xylene cold insoluble (XCI) fraction.

c) Intrinsic Viscosity

Intrinsic viscosity was measured according to DIN ISO 1628/1, October 1999 (in Decalin at 135° C.).

d) Charpy Notched Impact Strength was determined according to ISO 179-1 eA at +23° C. and at −20° C. on injection molded specimens of 80×10×4 $mm^3$ prepared according to EN ISO 1873-2. The measurement was done after 96 h conditioning time at 23° C. of the specimen.

e) Tensile Properties

Tensile modulus, tensile elongation at yield and tensile elongation at break were measured according to ISO 527-2 (cross head speed=1 mm/min; test speed 50 mm/min at 23° C.) using injection molded specimens 1B prepared as described in EN ISO 1873-2 (dog bone shape, 4 mm thickness). The measurement was done after 96 h conditioning time at 23° C. of the specimen.

f) Instrumented Puncture Test

Instrumented puncture test was performed on 60×60×3 $mm^3$ injection-molded plaques at 23° C. and −30° C. according to ISO 6603-2:2000. The measurement was done after 96 h conditioning time of the specimen at 23° C., −20° C. and −30° C.

g) Comonomer Content

Poly(Propylene-Co-Ethylene)-Ethylene Content-IR Spectroscopy

Quantitative infrared (IR) spectroscopy was used to quantify the ethylene content of the poly(ethylene-co-propene) copolymers through calibration to a primary method. Calibration was facilitated through the use of a set of in-house non-commercial calibration standards of known ethylene contents determined by quantitative $^{13}C$ solution-state nuclear magnetic resonance (NMR) spectroscopy. The calibration procedure was undertaken in the conventional manner well documented in the literature. The calibration set consisted of 38 calibration standards with ethylene contents ranging 0.2-75.0 wt. % produced at either pilot or full scale under a variety of conditions. The calibration set was selected to reflect the typical variety of copolymers encountered by the final quantitative IR spectroscopy method. Quantitative IR spectra were recorded in the solid-state using a Bruker Vertex 70 FTIR spectrometer. Spectra were recorded on 25×25 mm square films of 300 μm thickness prepared by compression moulding at 180-210° C. and 4-6 MPa. For samples with very high ethylene contents (>50 mol %) 100 μm thick films were used. Standard transmission FTIR spectroscopy was employed using a spectral range of 5000-500 cm$^{-1}$, an aperture of 6 mm, a spectral resolution of 2 cm$^{-1}$, 16 background scans, 16 spectrum scans, an interferogram zero filling factor of 64 and Blackmann-Harris 3-term apodisation. Quantitative analysis was undertaken using the total area of the CH$_2$ rocking deformations at 730 and 720 cm$^{-1}$ (A$_Q$) corresponding to (CH$_2$)$_{>2}$ structural units (integration method G, limits 762 and 694 cm$^{-1}$). The quantitative band was normalised to the area of the CH band at 4323 cm$^{-1}$ (A$_R$) corresponding to CH structural units (integration method G, limits 4650, 4007 cm$^{-1}$). The ethylene content in units of weight percent was then predicted from the normalised absorption (A$_Q$/A$_R$) using a quadratic calibration curve. The calibration curve having previously been constructed by ordinary least squares (OLS) regression of the normalised absorptions and primary comonomer contents measured on the calibration set.

Poly(Propylene-Co-Ethylene)-Ethylene Content-$^{13}$C NMR Spectroscopy

Quantitative $^{13}$C{$^1$H}NMR spectra were recorded in the solution-state using a Bruker Avance III 400 NMR spectrometer operating at 400.15 and 100.62 MHz for $^1$H and $^{13}$C respectively. All spectra were recorded using a $^{13}$C optimised 10 mm extended temperature probehead at 125° C. using nitrogen gas for all pneumatics. Approximately 200 mg of material was dissolved in 3 ml of 1,2-tetrachloroethane-d$_2$ (TCE-d$_2$) along with chromium (III) acetylacetonate (Cr(acac)$_3$) resulting in a 65 mM solution of relaxation agent in solvent (Singh, G., Kothari, A., Gupta, V., Polymer Testing 28 5 (2009), 475).

To ensure a homogenous solution, after initial sample preparation in a heat block, the NMR tube was further heated in a rotatory oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme (Zhou, Z., et al. J. Mag. Reson. 187 (2007) 225, and in Busico, V., et al, Macromol. Rapid Commun. 2007, 28, 1128). A total of 6144 (6 k) transients were acquired per spectra. Quantitative $^{13}$C{$^1$H}NMR spectra were processed, integrated and relevant quantitative properties determined from the integrals. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed (Cheng, H. N., Macromolecules 17 (1984), 1950) and the comonomer fraction calculated as the fraction of ethylene in the polymer with respect to all monomer in the polymer:

$$f_E = (E/(P+E))$$

The comonomer fraction was quantified using the method of Wang et. al. (Wang, W.-J., Zhu, S., Macromolecules 33 (2000), 1157) through integration of multiple signals across the whole spectral region in the $^{13}$C{$^1$H}spectra. This method was chosen for its robust nature and ability to account for the presence of regio-defects when needed. Integral regions were slightly adjusted to increase applicability across the whole range of encountered comonomer contents. For systems with very low ethylene content where only isolated ethylene in PPEPP sequences were observed the method of Wang et. al. was modified reducing the influence of integration of sites that are no longer present. This approach reduced the overestimation of ethylene content for such systems and was achieved by reduction of the number of sites used to determine the absolute ethylene content to $$E = 0.5(S_{\beta\beta} + S_{\beta\gamma} + S_{\beta\delta} + 0.5(S_{\alpha\beta} + S_{\alpha\gamma}))$$

Through the use of this set of sites the corresponding integral equation becomes $$E = 0.5(I_H + I_G + 0.5(I_C + I_D))$$

using the same notation used in the article of Wang et. al. (Wang, W.-J., Zhu, S., Macromolecules 33 (2000), 1157). Equations used for absolute propylene content were not modified. The mole percent comonomer incorporation was calculated from the mole fraction:

$$E[\text{mol \%}] = 100 * f_E.$$

The weight percent comonomer incorporation was calculated from the mole fraction:

$$E[\text{wt. \%}] = 100 * (f_E * 28.06)/((f_E * 28.06) + ((1 - f_E) * 42.08)).$$

h) MFR

Melt flow rates were measured with a load of 2.16 kg (MFR$_2$) at 230° C. (polypropylene based materials) or at 190° C. (polyethylene based materials). The melt flow rate is that quantity of polymer in grams which the test apparatus standardized to ISO 1133 extrudes within 10 minutes at a temperature of 230° C. (or 190° C.) under a load of 2.16 kg.

i) Density

Density was measured according to ISO 1183-187. Sample preparation was done by compression molding in accordance with ISO 1872-2:2007.

j) DSC Analysis, Melting Temperature ($T_m$) and Crystallization Temperature ($T_c$)

measured with a TA Instrument Q200 differential scanning calorimetry (DSC) on 5 to 7 mg samples. DSC is run according to ISO 11357/part 3/method C2 in a heat/cool/heat cycle with a scan rate of 10° C./min in the temperature range of −30 to +225° C. Crystallization temperature ($T_c$) and crystallization enthalpy ($H_c$) are determined from the cooling step, while melting temperature ($T_m$) and melting enthalpy ($H_m$) are determined from the second heating step.

k) Heat Deflection Temperature (HDT)

The HDT was determined on injection molded test specimens of 80×10×4 mm³ prepared according to ISO 1873-2 and stored at +23° C. for at least 96 hours prior to measurement. The test was performed on flatwise supported specimens according to ISO 75, condition B, with a nominal surface stress of 0.45 MPa.

l) Coefficient of Linear Thermal Expansion (CLTE)

The coefficient of linear thermal expansion (CLTE) was determined in accordance with ISO 11359-2:1999 on 10 mm long pieces cut from the same injection molded specimens as used for the tensile modulus determination. The measurement was performed in a temperature range from −30 to +80° C. at a heating rate of 1° C./min and a temperature range from 23 to +80° C. at a heating rate of 1° C./min in machine direction, respectively.

m) Particle Size of Elastomeric Phase

Atomic force microscopy (AFM) images were taken on cryo-cut surfaces prepared at −40° C. from the centre of 60×60×1 mm³ injection moulded specimens as prepared for the instrumented puncture test (IPT) to provide information about the disperse phase morphology. The cut was performed perpendicular to the flow direction in injection moulding and at 900 to the 60×60 mm² plane. An Asylum AFM instrument was applied in dynamic tapping mode to differentiate between the crystalline PP matrix phase and the softer elastomer phase. Based on the AFM phase images, the particle size distribution of the disperse phase was analysed which provide the number average particle size $D_{mean}$ for each example.

Experiments a) Preparation of HECO A1-A6

Catalyst System:

For the polymerization process of HECO A-1 to HECO A-6, a Ziegler-Natta type catalyst (ZN1) as used for the inventive examples of WO 2016/066446 A1 and described pre-polymerized with vinylcyclohexane to achieve nucleation with poly(vinylcyclohexane) was used.

Nucleation by prepolymerization with vinylcyclohexane is described in EP 2 960 256 B1 and EP 2 960 279 B1 in detail. These documents are incorporated by reference.

Polymerization of HECO A1-A6

HECO A1-A6 were made in prepolymerization/loop reactor/gas phase reactor 1/gas phase reactor 2/gas phase reactor 3 configuration followed by a pelletization step. The catalyst systems defined above was used in combination with triethyl-aluminium (TEAL) as co-catalyst and dicyclopentadienyl-dimethoxy silane (donor D) as external donor.

HECO A1-A5 resulted in polymer powders with an elastomeric phase (indicated as XCS content) of above 30 wt.-% and a melt flow rate of about 15 to 40 g/10 min. In order to reduce the elastomeric phase (XCS content) to an amount below 30 wt.-% and to increase the melt flow rate the polymer powder of HECO A1-A5 is diluted with a high flow propylene homopolymer, which resembles the propylene homopolymer produced as matrix material in the loop reactor and gas phase reactor 1. The weight amounts of the accordant polymer powder and propylene homopolymer as well as the melt flow rate of the propylene hompolymer blended in the dilution step are shown below in Table 1.

The diluted resins of HECO A1-A5 and the polymer powder of HECO A6 were compounded in a co-rotating twin-screw extruder Coperion ZSK 47 at 220° C. with 0.15 wt.-% antioxidant (Irganox B215FF from BASF AG, Germany; this is a 1:2-mixture of Pentaerythrityl-tetrakis(3-(3', 5'-di-tert. butyl-4-hydroxyphenyl)-propionate, CAS-no. 6683-19-8, and Tris (2,4-di-t-butylphenyl) phosphite, CAS-no. 31570-04-4); 0.05 wt.-% of of Ca-stearate (CAS-no. 1592-23-0, commercially available from Faci, Italy). The CRYSTEX QC analysis and other properties of these copolymers gave the results listed in Table 2.

TABLE 1

| Preparation of HECO A1-A6 | | | | | | | |
|---|---|---|---|---|---|---|---|
| | | HECO A1 | HECO A2 | HECO A3 | HECO A4 | HECO A5 | HECO A6 |
| Catalyst | | as described above | | | | | |
| Donor | | D | D | D | D | D | D |
| Prepoly | | | | | | | |
| Co/ED | mol/mol | 27.2 | 27.3 | 26.6 | 27.2 | 27.2 | 7.0 |
| Co/Ti | mol/mol | 256 | 227 | 183 | 297 | 323 | 390 |
| Temperature | ° C. | 20 | 20 | 20 | 20 | 20 | 28 |
| Residence time | min | 0.30 | 0.30 | 0.30 | 0.30 | 0.30 | 0.27 |
| Loop | | | | | | | |
| Temperature | ° C. | 75 | 75 | 75 | 75 | 75 | 75 |
| Pressure | kPa | 5400 | 5400 | 5400 | 5400 | 5400 | 5500 |

TABLE 1-continued

Preparation of HECO A1-A6

|  |  | HECO A1 | HECO A2 | HECO A3 | HECO A4 | HECO A5 | HECO A6 |
|---|---|---|---|---|---|---|---|
| Split | wt.-% | 40 | 40 | 38 | 41 | 38 | 44 |
| H2/C3 | mol/kmol | 34.4 | 34.3 | 33.3 | 34.5 | 35.1 | 36.7 |
| MFR$_2$ | g/10 min | 502 | 517 | 490 | 601 | 510 | 511 |
| GPR1 |  |  |  |  |  |  |  |
| Temperature | °C. | 80 | 80 | 80 | 80 | 80 | 80 |
| Pressure | kPa | 2200 | 2199 | 2199 | 2202 | 2198 | 2100 |
| Split | wt.-% | 29 | 31 | 28 | 26 | 27 | 38 |
| H2/C3 | mol/kmol | 281 | 283 | 279 | 280 | 291 | 203 |
| MFR$_2$ | g/10 min | 458 | 533 | 436 | 496 | 477 | 339 |
| XCS | wt.-% | 2.2 | 2.4 | 2.3 | 1.9 | 2.4 | 2.5 |
| GPR2 |  |  |  |  |  |  |  |
| Temperature | °C. | 75 | 75 | 75 | 75 | 75 | 75 |
| Pressure | kPa | 1900 | 1900 | 1900 | 1900 | 1900 | 1900 |
| C2/C3 | mol/kmol | 130 | 295 | 454 | 893 | 1827 | 119 |
| H2/C2 | mol/kmol | 122 | 122 | 119 | 121 | 114 | 172 |
| Split | wt.-% | 18 | 17 | 17 | 24 | 23 | 11 |
| C2 | wt.-% | 5.4 | 6.6 | 10.0 | 16.5 | 22.6 | 3.3 |
| MFR$_2$ | g/10 min | 50 | 87 | 77 | 68 | 43 | 120 |
| GPR3 |  |  |  |  |  |  |  |
| Temperature | °C. | 75 | 75 | 75 | 75 | 75 | 80 |
| Pressure | kPa | 1600 | 1600 | 1600 | 1600 | 1600 | 1700 |
| C2/C3 | mol/kmol | 128 | 300 | 457 | 897 | 1766 | 351 |
| H2/C2 | mol/kmol | 123 | 121 | 119 | 119 | 118 | 45.5 |
| Split | wt.-% | 13 | 12 | 17 | 9 | 12 | 7 |
| Powder |  |  |  |  |  |  |  |
| XCS | wt.-% | 32.8 | 30.3 | 30.3 | 32.8 | 30.5 | n.d. |
| C2(total) | wt.-% | 7.6 | 10.6 | 15.1 | 22.1 | 34.0 | n.d. |
| C2(XCS) | wt.-% | 21.9 | 33.8 | 41.2 | 52.5 | 66.6 | n.d. |
| iV(XCS) | dl/g | 2.98 | 3.29 | 3.28 | 3.24 | 3.03 | n.d. |
| MFR$_2$ | g/10 min | 17.5 | 33.4 | 36.4 | 26.7 | 16.5 | n.d. |
| Dilution |  |  |  |  |  |  |  |
| HECO | wt.-% | 64 | 63 | 60 | 58 | 64 | n.a. |
| PP-Homo | wt.-% | 36 | 37 | 40 | 42 | 36 | n.a. |
| MFR PP-Homo | g/10 min | 400 | 360 | 360 | 360 | 360 | n.a. |
| Pellet |  |  |  |  |  |  |  |
| XCS | wt.-% | 21.7 | 19.9 | 18.9 | 19.9 | 20.2 | 21.5 |
| C2(total) | wt.-% | 4.9 | 6.7 | 9.1 | 12.8 | 21.8 | 8.6 |
| C2(XCS) | wt % | 21.9 | 33.8 | 41.2 | 52.5 | 66.6 | 35.8 |
| iV(XCS) | dl/g | 2.98 | 3.29 | 3.28 | 3.24 | 3.03 | 3.1 |
| MFR$_2$ | g/10 min | 68 | 95 | 105 | 103 | 71 | 100 |
| Tm | °C. | 166 | 166 | 165 | 165 | 165 | 165 |
| Tc | °C. | 130 | 130 | 131 | 130 | 130 | 128 | n.d. = not determined;
n.a = not applicable b) Preparation of the Compositions of Examples IE1, IE2 and CE1-CE4

Talc B was TALC HM2 with a $d_{50}$ of 2.4 μm and a $d_{95}$ of 10.0 μm (Sedigraph measurement), commercially available from Imifabi S.P.A).

The final compositions were compounded in a Coperion ZSK40 twin-screw extruder at 220° C. using the polymers and talc B as nucleating agent together with antioxidants, calcium stearate, antistatic agents. The compositions of the examples are shown in Table 2.

TABLE 2

Compositions of the examples

|  | CE1 | IE1 | IE2 | CE2 | CE3 | CE4 |
|---|---|---|---|---|---|---|
| HECO A1, wt.-% | 98.5 | — | — | — | — | — |
| HECO A2, wt.-% | — | 98.5 | — | — | — | — |
| HECO A3, wt.-% | — | — | 98.5 | — | — | — |
| HECO A4, wt.-% | — | — | — | 98.5 | — | — |
| HECO A5, wt.-% | — | — | — | — | 98.5 | — |
| HECO A6, wt.-% | — | — | — | — | — | 98.5 |
| Talc B, wt.-% | 0.9 | 0.9 | 0.9 | 0.9 | 0.9 | 0.9 |
| Irganox B215 FF, wt.-% | 0.15 | 0.15 | 0.15 | 0.15 | 0.15 | 0.15 |
| Acid scavenger (Ca-stearate), wt.-% | 0.05 | 0.05 | 0.05 | 0.05 | 0.05 | 0.05 |
| Antistatic agent (glycerol monostearate), wt.-% | 0.33 | 0.33 | 0.33 | 0.33 | 0.33 | 0.33 |
| Antistatic agent (glycerol monolaureate), wt.-% | 0.07 | 0.07 | 0.07 | 0.07 | 0.07 | 0.07 | c) Properties of the compositions of of examples IE1, IE2 and CE1-CE4

Table 3 shows the properties of the examples.

TABLE 3

CRYSTEX QC analysis and other properties of the compositions of examples IE1, IE2 and CE1-CE4

|  |  | CE1 | IE1 | IE2 | CE2 | CE3 | CE4 |
|---|---|---|---|---|---|---|---|
| CF | wt.-% | 82.7 | 78.1 | 78.5 | 77.2 | 77.6 | 78.0 |
| C2(CF) | wt.-% | 1.9 | 2.3 | 2.5 | 4.8 | 9.8 | 1.9 |
| iV(CF) | dl/g | 1.20 | 1.02 | 1.02 | 1.05 | 1.20 | 1.1 |
| SF | wt.-% | 17.3 | 21.9 | 21.5 | 22.8 | 22.4 | 22.0 |
| C2(SF) | wt.-% | 20.1 | 28.4 | 34.1 | 46.7 | 56.0 | 35.0 |
| iV(SF) | dl/g | 2.39 | 2.67 | 2.78 | 2.88 | 3.32 | 3.0 |
| C2(SF)/C2(CF) |  | 10.6 | 12.3 | 13.6 | 9.7 | 5.7 | 18.4 |
| iV(SF)/iV(CF) |  | 1.99 | 2.62 | 2.73 | 2.74 | 2.77 | 2.73 |
| C2(total) | wt.-% | 5.25 | 7.86 | 9.39 | 13.76 | 20.01 | 9.1 |
| $D_{mean}$ (EPC) | nm | 387 | 1236 | 1256 | 1112 | 1347 | 763 |
| $MFR_2$ | g/10 min | 67.6 | 95.1 | 105.1 | 102.7 | 71.3 | 100 |
| Tm | ° C. | 166 | 166 | 165 | 165 | 165 | 165 |
| Tc | ° C. | 130 | 130 | 131 | 130 | 130 | 128 |
| Tensile modulus | MPa | 1309 | 1400 | 1474 | 1413 | 1337 | 1400 |
| Elongation@break | % | 2.7 | 5.2 | 5.5 | 3.7 | 3.0 | n.d. |
| Charpy NIS, 23° C. | $kJ/m^2$ | 6.5 | 5.5 | 3.1 | 1.9 | 1.5 | 5 |
| Charpy NIS, −20° C. | $kJ/m^2$ | 1.5 | 3.2 | 2.7 | 2.0 | 1.7 | 3 |
| IPT, 23° C. | J | 7.4 | 11.1 | 5.7 | 1.7 | 0.9 | 5.1 |
| IPT, −20° C. | J | 0.2 | 5.6 | 4.6 | 2.1 | 1.1 | 4.1 |
| HDT B | ° C. | 96 | 98 | 100 | 96 | 90 | 92 |
| CLTE 23-80° C., MD | μm/m° C. | 131 | 127 | 126 | 133 | 136 | 130 |
| CLTE 23-80° C., TD | μm/m° C. | 140 | 137 | 135 | 140 | 146 | 139 |
| CLTE −30-80° C., MD | μm/m° C. | 110 | 111 | 110 | 117 | 123 | n.d. |
| CLTE −30-80° C., TD | μm/m° C. | 120 | 120 | 118 | 127 | 137 | n.d. |

Inventive examples IE1 and IE2 show an ethylene content in the soluble fraction (C2(SF)) of 28.4 wt.-% and 34.1 wt.-% and a ratio of the ethylene contents in the soluble fraction and crystalline fraction (C2(SF)/C2(CF)) of 12.3 and 13.6 and thereby clearly differ from the comparative examples. The inventive examples also show a number average particle size of the elastomeric phase ($D_{mean}$ (EPC)) of 1236 nm and 1256 nm.

The relation of number average particle size of the elastomeric phase (D50 (EPC)) in view of the ethylene content in the soluble fraction (C2(SF)) is shown in FIG. 1.

FIG. 1 illustrates the relation of mean particle size of the elastomeric phase (D50 (EPC)) in view of the ethylene content in the soluble fraction (C2(SF)) of examples IE1, IE2 and CE1-CE3 in the upper graph. The heterophasic propylene copolymers of these examples are closely related to each other as being polymerized using the same catalyst system and reactor set-up. In all examples IE1, IE2 and CE1-CE3 the reactor conditions are adapted as to produce a unimodal propylene homopolymer in the loop reactor and GPR1 and a unimodal propylene ethylene copolymer in GPR2 and GPR3.

The relation of mean particle size of the elastomeric phase (D50 (EPC)) in view of the ethylene content in the soluble fraction (C2(SF)) of example CE4 falls out of said graph as for CE4 a bimodal propylene homopolymer is produced in the loop reactor and GPR1 and a unimodal propylene ethylene copolymer is produced in GPR2 and GPR3.

The lower graph shows the relation of mean particle size of the elastomeric phase (D50 (EPC)) in view of the ethylene content in the xylene cold soluble fraction (C2(XCS)) as shown in the study of Grein et al., Rheologica Acta 46 (2007) 1083-1089, in which for the first time the relation of mean particle size of the elastomeric phase ($D_{mean}$ (EPC)) in view of the ethylene content in the xylene cold soluble fraction (C2(XCS)) of heterophasic propylene copolymers was studied.

Inventive examples IE1 and IE2 show an improved balance of properties in regard of higher tensile modulus, increased Charpy notched impact strength especially at low temperatures, increased puncture energy especially at low temperatures at and comparable tensile properties, impact properties, CLTE and shrinkage.

These improvements are illustrated in FIGS. 2 and 3.

Figure 1:
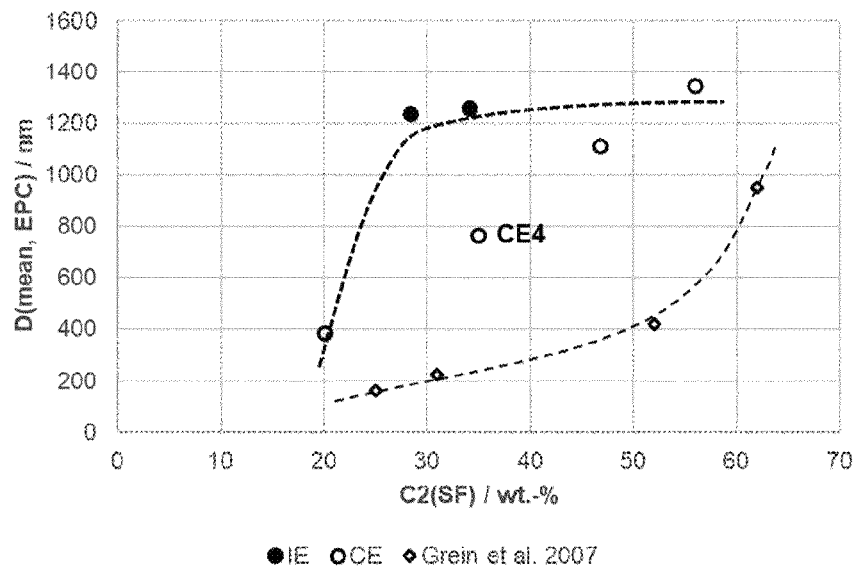
Figure 2:
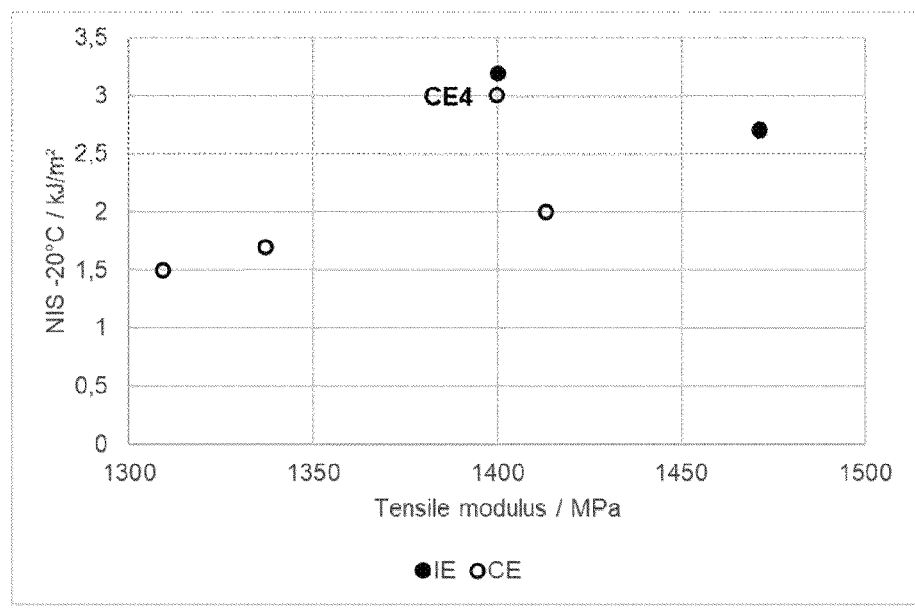
FIG. 2 shows the relation of Charpy notched impact strength at −20° C. in view of the tensile modulus of examples IE1, IE2, CE1-CE3 and CE4 as reference example. It can be seen that the inventive compositions of examples IE1 and IE2 show an increased Charpy notched impact strength at −20° C. at the given tensile modulus.
Figure 3:
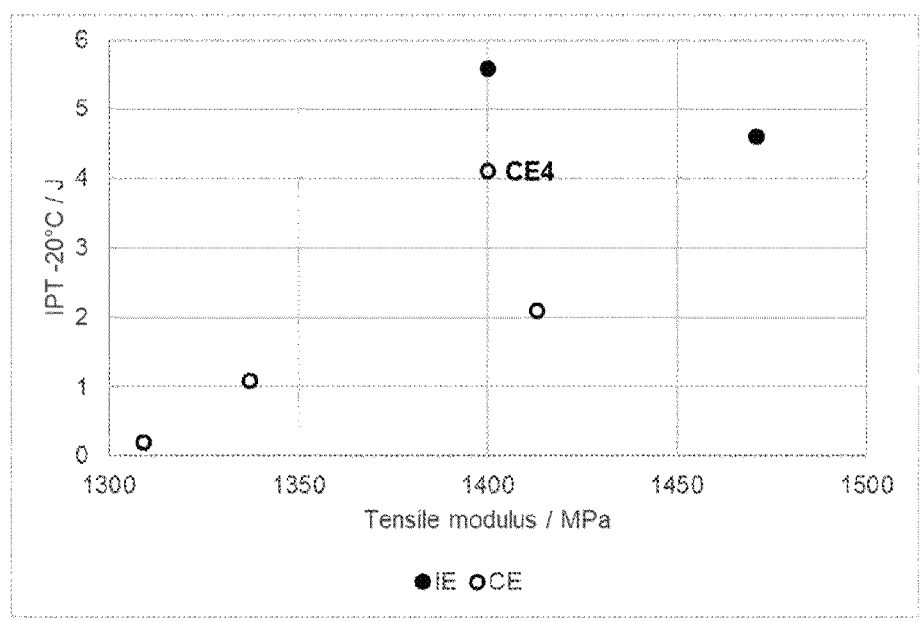
FIG. 3 shows the relation of instrumented puncture test at −20° C. in view of the tensile modulus of examples IE1, IE2, CE1-CE3 and CE4 as reference example. It can be seen that the inventive compositions of examples IE1 and IE2 show an increased instrumented puncture test at −20° C. at the given tensile modulus.

The invention claimed is:

1. A polypropylene composition comprising
(A) at least 95.0 wt % of a heterophasic propylene copolymer; and
(B) up to 1.5 wt % of a particulate inorganic nucleating agent,
wherein all percentages refer to a total composition, and wherein
the heterophasic propylene copolymer (A) comprises a matrix phase and an elastomeric phase dispersed therein and the polypropylene composition has
a soluble fraction (SF) and a crystalline fraction (CF), determined according to CRYSTEX QC analysis;
a soluble fraction (SF) content determined according to CRYSTEX QC analysis in a range from 15.0 wt % to 30.0 wt %;
an ethylene content of the soluble fraction C2(SF), as determined by FT-IR spectroscopy calibrated by quantitative $^{13}$C-NMR spectroscopy, in a range from 25.0 to 40.0 wt %;

an intrinsic viscosity of the soluble fraction iV(SF), as measured in decalin according to DIN ISO 1628/1 at 135° C., of 2.0 dl/g to 3.5 dl/g;

a ratio of ethylene contents of the soluble fraction and crystalline fraction (C2(SF)/C2(CF)) of 11.0 to 15.0; and a melt flow rate MFR$_2$ (230° C., 2.16 kg, ISO 1133) of 75 to 250 g/10 min.

2. The polypropylene composition according to claim 1, wherein the particulate inorganic nucleating agent (B) is talc.

3. The polypropylene composition according to claim 1, wherein the particulate inorganic nucleating agent (B) has
a median particle size d$_{50}$ before compounding of 0.5 to 7.5 micrometers; and/or
a top-cut particle size d$_{95}$ before compounding of 2.0 to 20.0 micrometers.

4. The polypropylene composition according to claim 1 having
a crystalline fraction (CF) content determined according to CRYSTEX QC analysis in a range from 70.0 to 85.0 wt %; and/or
an ethylene content in the crystalline fraction C2(CF), as determined by FT-IR spectroscopy calibrated by quantitative $^{13}$C-NMR spectroscopy, of 1.5 to 3.0 wt %; and/or
an intrinsic viscosity of the crystalline fraction iV(CF), as measured in decalin according to DIN ISO 1628/1 at 135° C. of 0.7 to 1.7 dl/g; and/or
a ratio of intrinsic viscosities of the soluble fraction and crystalline fraction (iV(SF)/iV(CF)) of 2.2 to 3.0; and/or
a total content of units derived from ethylene (C2), as determined by FT-IR spectroscopy calibrated by quantitative $^{13}$C-NMR spectroscopy, of 5.5 to 12.5 wt %.

5. The polypropylene composition according to claim 1 having
a number average particle size of the particles of the elastomeric phase dispersed in the matrix phase of from 1150 to 1325 nm, determined as described in the experimental section; and/or
a melt temperature Tm of from 155 to 175° C., measured by differential scanning calorimetry (DSC) according to ISO 11357/part 3/method C2; and/or
a crystallization temperature Tc of from 120 to 140° C., measured by differential scanning calorimetry (DSC) according to ISO 11357/part 3/method C2; and/or
a heat deflection temperature HDT B of from 92 to 110° C., determined on injection molded test specimens of 80×10×4 mm$^3$ prepared according to ISO 1873-2.

6. The polypropylene composition according to claim 1 having
a tensile modulus of from 1250 MPa to 1600 MPa; and/or
a tensile elongation at break of from 4.0 to 25.0%,
all measured according to ISO 527-2 (cross head speed=1 mm/min; test speed 50 mm/min at 23° C.) using injection molded specimens 1B prepared as described in EN ISO 1873-2 (dog bone shape, 4 mm thickness).

7. The polypropylene composition according to claim 1 having
a Charpy Notched Impact Strength at 23° C. (CNIS at 23° C.) of from 2.5 to 6.4 kJ/m$^2$; and/or
a Charpy Notched Impact Strength at −20° C. (CNIS at −20° C.) of from 2.0 to 5.5 kJ/m$^2$,
all measured according to ISO 179-1 eA at +23° C. and at −20° C. on injection molded specimens of 80×10×4 mm$^3$ prepared according to EN ISO 1873-2.

8. The polypropylene composition according to claim 1 having
a puncture energy of from 4.5 to 20.0 J, when determined in the instrumented puncture test according to ISO 6603-2 at 23° C., and/or
puncture energy of from 3.5 to 15.0 J, when determined in the instrumented puncture test according to ISO 6603-2 at −20° C.

9. A process for preparing a polypropylene composition according to claim 1 comprising:
polymerizing the heterophasic propylene copolymer (A) in the presence of a Ziegler-Natta catalyst system in a multistage process comprising at least two polymerization reactors connected in series, and
blending the heterophasic propylene copolymer (A) with the particulate inorganic nucleating agent (B).

10. The process according to claim 9 comprising:
a) polymerizing propylene in the presence of the Ziegler-Natta catalyst system in a first polymerization reactor for producing a first propylene homopolymer fraction;
b) transferring a polymerization mixture comprising the Ziegler-Natta catalyst system and the first propylene homopolymer fraction from the first polymerization reactor to a second polymerization reactor;
c) polymerizing propylene in the presence of the Ziegler-Natta catalyst system in the second polymerization reactor for producing a second propylene homopolymer fraction;
d) transferring a polymerization mixture comprising the Ziegler-Natta catalyst system and the first and second propylene homopolymer fractions from the second polymerization reactor to a third polymerization reactor;
e) polymerizing propylene and ethylene in the presence of the Ziegler-Natta catalyst system in the third polymerization reactor for producing a first propylene-ethylene copolymer fraction;
f) transferring a polymerization mixture comprising the Ziegler-Natta catalyst system, the first and second propylene homopolymer fractions and the first propylene-ethylene copolymer fraction from the third polymerization reactor to a fourth polymerization reactor;
g) polymerizing propylene and ethylene in the presence of the Ziegler-Natta catalyst system in the fourth polymerization reactor for producing a second propylene-ethylene copolymer fraction;
h) withdrawing a polymerization mixture comprising the Ziegler-Natta catalyst system, the first and second propylene homopolymer fractions and the first and second propylene-ethylene copolymer fractions from the fourth polymerization reactor; and
i) obtaining the heterophasic propylene copolymer (A) comprising the first and second propylene homopolymer fractions and the first and second propylene-ethylene copolymer fractions.

11. The process according to claim 9, wherein the Ziegler-Natta catalyst system is a solid Ziegler-Natta catalyst system, which comprises compounds of a transition metal of Group 4 to 6 of IUPAC, a Group 2 metal compound, and an internal donor.

12. The process according to claim 10, wherein a combined first and second propylene homopolymer fractions obtained from the second polymerization reactor has a melt flow rate MFR$_2$ (230° C., 2.16 kg, ISO 1133) of 250 to 600 g/10 min.

13. An article comprising the polypropylene composition according to claim 1.

14. The article according to claim 13 having
a coefficient of linear thermal expansion at a temperature range from +23 to +80° C. at a heating rate of 1° C./min in machine direction (CLTE 23-80° C., MD) of below 130 μm/m° C., and/or
a coefficient of linear thermal expansion at a temperature range from +23 to +80° C. at a heating rate of 1° C./min in transverse direction (CLTE 23-80° C., TD) of below 140 μm/m° C., and/or
a coefficient of linear thermal expansion at a temperature range from −30 to +80° C. at a heating rate of 1° C./min in machine direction (CLTE-30-80° C., MD) of below 115 μm/m° C., and/or
a coefficient of linear thermal expansion at a temperature range from −30 to +80° C. at a heating rate of 1° C./min in transverse direction (CLTE-30-80° C., TD) of below 125 μm/m° C.,
all determined in accordance with ISO 11359-2:1999.

* * * * *